US009762866B2

(12) United States Patent
Lim et al.

(10) Patent No.: US 9,762,866 B2
(45) Date of Patent: Sep. 12, 2017

(54) PLANAR PREDICTION MODE

(71) Applicant: LG Electronics Inc., Seoul (KR)

(72) Inventors: Jaehyun Lim, Seoul (KR);
Byeongmoon Jeon, Seoul (KR);
Seungwook Park, Seoul (KR); Jaewon Sung, Seoul (KR); Jungsun Kim, Seoul (KR); Yongjoon Jeon, Seoul (KR); Joonyoung Park, Seoul (KR); Younghee Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 14/324,446

(22) Filed: Jul. 7, 2014

(65) Prior Publication Data

US 2014/0321542 A1 Oct. 30, 2014

Related U.S. Application Data

(63) Continuation of application No. 13/115,397, filed on May 25, 2011, now Pat. No. 8,798,146.

(Continued)

(51) Int. Cl.
*H04N 19/50* (2014.01)
*G06K 9/36* (2006.01)
(Continued)

(52) U.S. Cl.
CPC ............... *H04N 7/32* (2013.01); *G06K 9/36* (2013.01); *H04N 19/11* (2014.11); *H04N 19/14* (2014.11);
(Continued)

(58) Field of Classification Search
CPC .... H04N 19/593; H04N 19/105; H04N 19/61; H04N 19/182; H04N 7/32; H04N 19/82;
(Continued)

(56) References Cited

U.S. PATENT DOCUMENTS 6,980,596 B2 * 12/2005 Wang .................... H04N 19/105
375/240.12
7,236,524 B2 * 6/2007 Sun ....................... H04N 19/197
375/240.12
(Continued)

FOREIGN PATENT DOCUMENTS

CN 1929611 A 3/2007
CN 101212684 A 7/2008
(Continued)

OTHER PUBLICATIONS

Chinese Office Action dated Nov. 24, 2014 for Chinese Application No. 201180026091.0, with English Translation, 21 pages.
(Continued)

*Primary Examiner* — Dramos I Kalapodas
(74) *Attorney, Agent, or Firm* — Fish & Richardson P.C.

(57) ABSTRACT

New intra planar modes are introduced for predicting digital video data. As part of the new intra planar modes, various methods are offered for predicting a first sample within a prediction unit, where the first sample is needed for referencing to when processing the new intra planar modes. And once the first sample is successfully predicted, the new intra planar modes are able to predict a sample of video data within the prediction unit by processing a bi-linear interpolation of four previously reconstructed reference samples.

7 Claims, 21 Drawing Sheets

Related U.S. Application Data

(60) Provisional application No. 61/347,821, filed on May 25, 2010, provisional application No. 61/445,538, filed on Feb. 23, 2011, provisional application No. 61/451,121, filed on Mar. 10, 2011, provisional application No. 61/471,185, filed on Apr. 3, 2011.

(51) Int. Cl.
| | | |
|---|---|---|
| *H04N 19/593* | (2014.01) | |
| *H04N 19/11* | (2014.01) | |
| *H04N 19/14* | (2014.01) | |
| *H04N 19/157* | (2014.01) | |
| *H04N 19/182* | (2014.01) | |
| *H04N 19/44* | (2014.01) | |
| *H04N 19/80* | (2014.01) | |
| *H04N 19/82* | (2014.01) | |

(52) U.S. Cl.
CPC ......... *H04N 19/157* (2014.11); *H04N 19/182* (2014.11); *H04N 19/44* (2014.11); *H04N 19/50* (2014.11); *H04N 19/593* (2014.11); *H04N 19/80* (2014.11); *H04N 19/82* (2014.11)

(58) Field of Classification Search
CPC ...... H04N 19/80; H04N 19/157; H04N 19/50; H04N 19/11; H04N 19/14; H04N 19/44; H04N 19/91; H04N 19/18; H04N 19/124; H04N 19/117; H04N 19/176; H04N 19/00763; H04N 13/0048; H04N 19/96; H04N 19/597; H04N 19/70; H04N 19/154; H04N 19/186; H04N 19/513; H04N 19/52; G06K 9/36

See application file for complete search history.

(56) References Cited

U.S. PATENT DOCUMENTS

| | | | | |
|---|---|---|---|---|
| 7,499,492 | B1* | 3/2009 | Ameres ............... | H04N 7/50 341/65 |
| 8,189,667 | B2* | 5/2012 | Kawashima ........ | H04N 19/147 375/240.13 |
| 8,311,110 | B2* | 11/2012 | Alshina ............... | H04N 19/13 375/240.12 |
| 8,619,857 | B2* | 12/2013 | Zhao ................... | H04N 19/50 375/240.12 |
| 8,644,375 | B2* | 2/2014 | Segall ................. | H04N 19/436 375/240 |
| 2003/0223495 | A1* | 12/2003 | Sun ..................... | H04N 19/197 375/240.12 |
| 2005/0089235 | A1 | 4/2005 | Sakaguchi | |
| 2005/0265447 | A1* | 12/2005 | Park ..................... | H04N 19/105 375/240.03 |
| 2006/0008164 | A1 | 1/2006 | Wu | |
| 2007/0002945 | A1 | 1/2007 | Kim | |
| 2007/0053433 | A1 | 3/2007 | Song | |
| 2007/0071105 | A1 | 3/2007 | Tian | |
| 2008/0159388 | A1 | 7/2008 | Kim | |
| 2009/0097557 | A1 | 4/2009 | Takahashi | |
| 2009/0257668 | A1 | 10/2009 | Ye | |
| 2009/0310677 | A1 | 12/2009 | Shiodera | |
| 2010/0002775 | A1* | 1/2010 | Huang ................. | H04N 19/176 375/240.24 |
| 2010/0128995 | A1 | 5/2010 | Drugeon | |
| 2010/0195722 | A1* | 8/2010 | Boon .................... | H04N 19/11 375/240.12 |
| 2010/0208802 | A1 | 8/2010 | Tsukuba | |
| 2010/0226437 | A1 | 9/2010 | Robertson | |
| 2010/0254450 | A1 | 10/2010 | Narroschke | |
| 2010/0322309 | A1 | 12/2010 | Huang | |
| 2011/0135000 | A1* | 6/2011 | Alshina ............... | H04N 19/105 375/240.13 |
| 2011/0182357 | A1 | 7/2011 | Kim | |
| 2011/0280304 | A1* | 11/2011 | Jeon .................... | H04N 19/105 375/240.12 |
| 2012/0121013 | A1* | 5/2012 | Lainema .............. | H04N 7/32 375/240.12 |
| 2013/0058411 | A1* | 3/2013 | Xu ....................... | H04N 19/105 375/240.12 |
| 2013/0129237 | A1* | 5/2013 | Yie ...................... | G06T 9/004 382/233 |
| 2014/0341281 | A1* | 11/2014 | Bossen ............... | H04N 19/159 375/240.12 |

FOREIGN PATENT DOCUMENTS

| | | |
|---|---|---|
| EP | 1 761 063 A2 | 3/2007 |
| EP | 1 940 178 A2 | 7/2008 |
| KR | 10-2009-0116655 | 11/2009 |
| WO | WO 2009/157669 A3 | 4/2010 |

OTHER PUBLICATIONS

Kemal Ugur et al., "Appendix to Description of video coding technology proposal" and "Joint Collaborative Team on Video Coding (JCT-VC)", Apr. 15-23, 2010, pp. 39-42.

Zhang Nan, et al.. "Spatial Prediction Based Intra-Coding"; 2004 IEEE International Dec. 31, 2004 Conference on Multimedia and Expo(ICME), Dec. 31, 2004, pp. 97-100.

European Search Report dated Aug. 31, 2011 for Application No. 11004325, 13 pages.

Ugur (Nokia) K, Et Al; "Video coding technology proposal by Tandberg, Nokia, and Ericsson", 1. JCT-VC Meeting; Apr. 15, 2010-Apr. 23, 2010;Dresden;(Joint Collaborative Team on Video Coding of ISO/IEC JTC1/SC29/WG11 and ITU-T SG.16); URL:http://wftp3.itu.int/av-arch/jctvc-site/, Apr. 24, 2010, XP 030007563.

Zhang Nan Et Al; Spatial prediction based intra-coding:, 2004 IEEE International Conference on Multimedia and Expo (ICME):Jun. 27-30, 2004, Taipei, Taiwan, Piscataway, NJ : IEEE Operations Center, US, vol. 1, Jun. 27, 2004, pp. 97-100, XP010770753, DOI:DOI:10.1109/ICME.2004.1394134 ISBN:978-0-7803-8603-7.

Thiow Keng Tan Et Al; "Intra Prediction by Aberaged Template Matching Predictors", Consumer Communications and Networking Conference, 2007. CCNC 2007. 20 04 1th IEEE, IEEE, PI, Jan. 1, 2007, pp. 405-409, XP031087817, ISBN:978-1-4244-0667-8.

Sandeep Kanumuri Et Al; "Enhancements to Intra Coding", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/,,Jan. 14, 2011 (Jan. 14, 2011), XP030008275.

Davies (BBC) T Et Al, "Suggestion for a Test Model", 1. JCT-VC Meeting; Apr. 15, 2010-Apr. 23, 2010; Dresden; (Joint Collabolative Team on Video Coding of ISO/IEC JTC1/SC29/WG11 and ITU-T SG.16); URL: http://wftp3.itu.int/av-arch/jctvc-site/,,May 7, 2010, XP030007526.

International Search Report dated Feb. 6, 2012 for Application No. PCT/KR2011/003828, in English, 3 pages.

* cited by examiner

· · · ▸ Linear interpolation

- - -> Linear interpolation

- - -▶  Linear interpolation

First linear interpolation $W_H \times$

Second linear interpolation $+ W_V \times$

PLANAR PREDICTION MODE

CROSS-REFERENCE TO RELATED APPLICATIONS

This application is a continuation of U.S. application Ser. No. 13/115,397, filed May 25, 2011, now allowed, which claims the benefit of U.S. Provisional Patent Application No. 61/347,821 filed on May 25, 2010; U.S. Provisional Patent Application No. 61/445,538 filed on Feb. 23, 2011; U.S. Provisional Patent Application No. 61/451,121 filed on Mar. 10, 2011; and U.S. Provisional Patent Application No. 61/471,185 filed on Apr. 3, 2011 all of which are hereby incorporated by reference as if fully set forth herein.

BACKGROUND

Field of the Invention

The present invention relates to a method and apparatus for performing intra planar mode type prediction decoding on digital video data that has been encoded using an intra planar mode type prediction.

Discussion of the Related Art

A digital video signal is comprised of a sequence of digital video frames that are a representation of an original RGB video signal. As part of the analog to digital signal transformation, each frame of the original RGB video signal is encoded into the digital video frames of data that comprise the digital video signal. The purpose of the encoding process is to calculate as accurate a digital prediction of the original RGB video signal as possible while also attempting to maximize a compression of the binary data that is the digital representation of the original RGB video signal. While there exists both inter prediction methods and intra prediction methods for encoding a video signal, the present invention is only concerned with the intra prediction method that is also referred to as a spatial prediction method.

In order to accomplish the encoding process, an encoding unit will process a prediction on a portion of an original video frame in order to encode it into digital video data. The resulting encoded digital video data is referred to as a prediction unit. A plurality of prediction units will typically comprise a tree block of video data, a plurality of tree blocks will typically comprise a slice of video data and a plurality of slices will then typically comprise a frame of digital video data, although other configurations are possible. Pertaining specifically to the intra prediction methods that rely on spatial predictions, a current prediction unit that is being processed will be predicted by referencing previously predicted samples that spatially neighbor the current prediction unit. Once all of the digital video frames have been predicted and encoded, the digital video program is said to be fully compressed and ready for storage or transmission as digital video data or a signal. Along with the actual digital video data, the encoding unit will also include identifying information that indicates which prediction mode was applied to predict each prediction unit of video data.

A decoding unit is then tasked with performing the decoding, or decompression, of the digital video data/signal. The decoding is processed by applying the same prediction mode processing on each prediction unit as was applied by the encoding unit. This is accomplished by parsing the identifying information and determining the proper prediction mode that is identified for predicting each prediction unit of video data. By applying the proper prediction on each of the prediction units of video data, the decoding unit is able to successfully reconstruct the original video. The decoding unit is thus assigned the task of reconstructing the digital video signal into a displayable representation of the original video signal. According to the intra prediction mode for decoding a prediction unit, previously reconstructed samples from previously reconstructed prediction units will be referenced to reconstruct samples of a current prediction unit that is currently being processed by the decoding unit.

Of the many available intra prediction modes for predicting a prediction unit of digital video data, the present invention is concerned with the intra planar prediction mode. The intra planar mode prediction is generally known to first predict a single sample within a current prediction unit by referencing neighboring blocks that have been previously reconstructed. Then after predicting the first sample within the current prediction unit, the remaining samples of the current prediction unit are predicted by referencing the predicted first sample within the current prediction unit and reconstructed samples from the blocks that neighbor the current prediction unit.

SUMMARY OF THE INVENTION

It is an object of the present invention to offer a variety of new methods for obtaining the prediction of a first sample within a current prediction unit, where the current prediction unit is being predicted according to a new intra planar mode of the present invention.

It is also an object of the present invention to offer a variety of methods for predicting the remaining samples within the current prediction unit once the first sample within the current prediction unit has been predicted and reconstructed. According to the present invention, these methods will predict the remaining samples within the current prediction unit by referencing the first sample as well as previously reconstructed samples from blocks that neighbor the current prediction unit.

It is to be understood that both the foregoing general description and the following detailed description of the present invention are exemplary and explanatory and are intended to provide further explanation of the present invention as claimed.

DETAILED DESCRIPTION

Reference will now be made in detail to the preferred embodiments of the present invention, examples of which are illustrated in the accompanying drawings. Terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in an intended way. The embodiments disclosed in this disclosure and configurations shown in the accompanying drawings are exemplary in nature and are not intended to be inclusive in nature. The preferred embodiments do not represent all possible technical variations of the present invention. Therefore, it is understood that the present invention covers the modifications and variations of this invention provided they come within the scope of the appended claims and their equivalents at the timing point of filing this application.

It is noted that for the purposes of the detailed explanation that follows, all mention of a neighboring block is understood to be in reference to a block that neighbors a current prediction unit. A current prediction unit is understood to include the current prediction samples that are being prediction processed according to the new intra planar modes of the present invention. Distance H refers to a height, in samples, of the current prediction unit, and W refers to a width, in samples, of the current prediction unit. Also any gray areas are illustrated to represented previously reconstructed samples. Reconstructed samples have been predicted and combined with a residual value that is included in a video signal, and such reconstructed samples may be referenced for predicting samples according to the present invention. Predicted samples have not yet been combined with a residual value to be reconstructed, but have been prediction processed and may also be referenced for predicting samples according to this present invention. And any use of the term "samples" is understood to be interchangeable with the commonly known term of "pixels".

Figure 1:
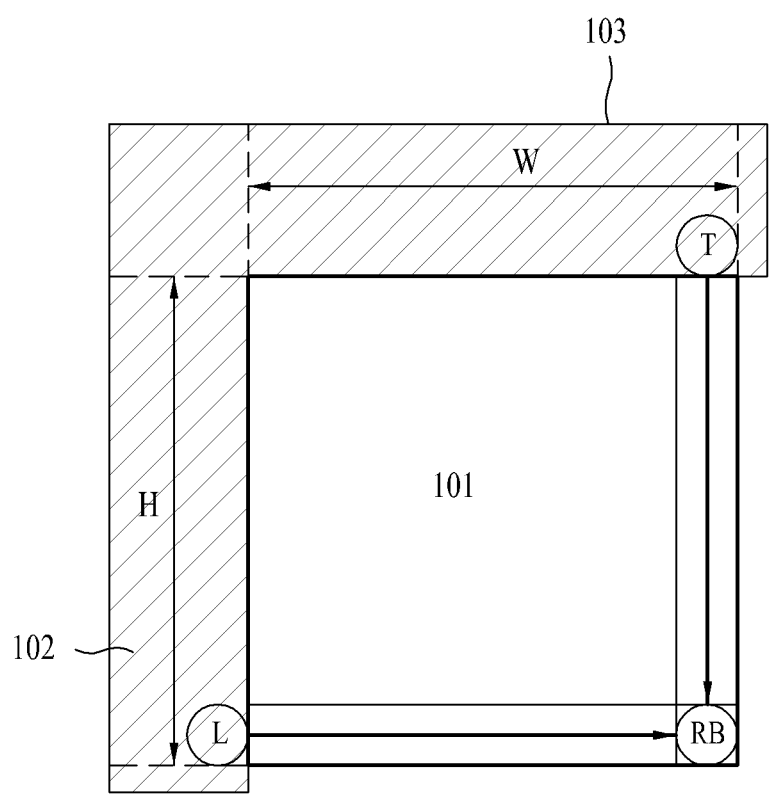
FIG. 1 illustrates a first embodiment for obtaining the first sample of a prediction unit according to the present invention.

FIG. 1 illustrates a first embodiment for predicting a first current prediction sample RB from within a current prediction unit 101 for referencing in the new intra planar mode prediction method according to the present invention. The current prediction unit 101 is seen to have a neighboring left block 102 located adjacent and to the left of the current prediction unit 101. And the current prediction unit 101 is seen to have a neighboring top block 103 located adjacent and to the top of the current prediction block 101. Both the neighboring left block 102 and neighboring top block 103 are depicted as gray areas to indicate that they consist of previously reconstructed samples. Although only the first current prediction sample RB is specifically illustrated, the current prediction unit 101 also additionally contains a plurality of current prediction samples that need to be predicted and eventually reconstructed. Also, the first current prediction sample RB will be the sample located at the right-bottom of current prediction unit 101.

According to the first embodiment for predicting the first current prediction sample RB from within the current prediction unit 101, the first current prediction sample RB will be predicted based on an intra DC mode prediction. The intra DC mode prediction will reference the sample value for sample T and the sample value for sample L and determine an average value of these two sample values. The reference sample T is referenced from the neighboring top block 103, and the reference sample L is referenced from the neighboring left block 102. Then according to the intra DC mode prediction, the average sample value for reference samples T and L will serve as the prediction value for the first current prediction sample RB. Now with this intra DC mode prediction value, the predicted value for RB can be referenced to predict the remaining samples of the current prediction unit 101. Although FIG. 1 specifically identifies the positions for reference samples L and T, it is within the scope of the present invention for reference sample L to be referenced from any one of the samples from the neighboring left block 102, and it is within the scope of the present invention for reference sample T to be referenced from any one of the samples from the neighboring top block 103.

Figure 2:
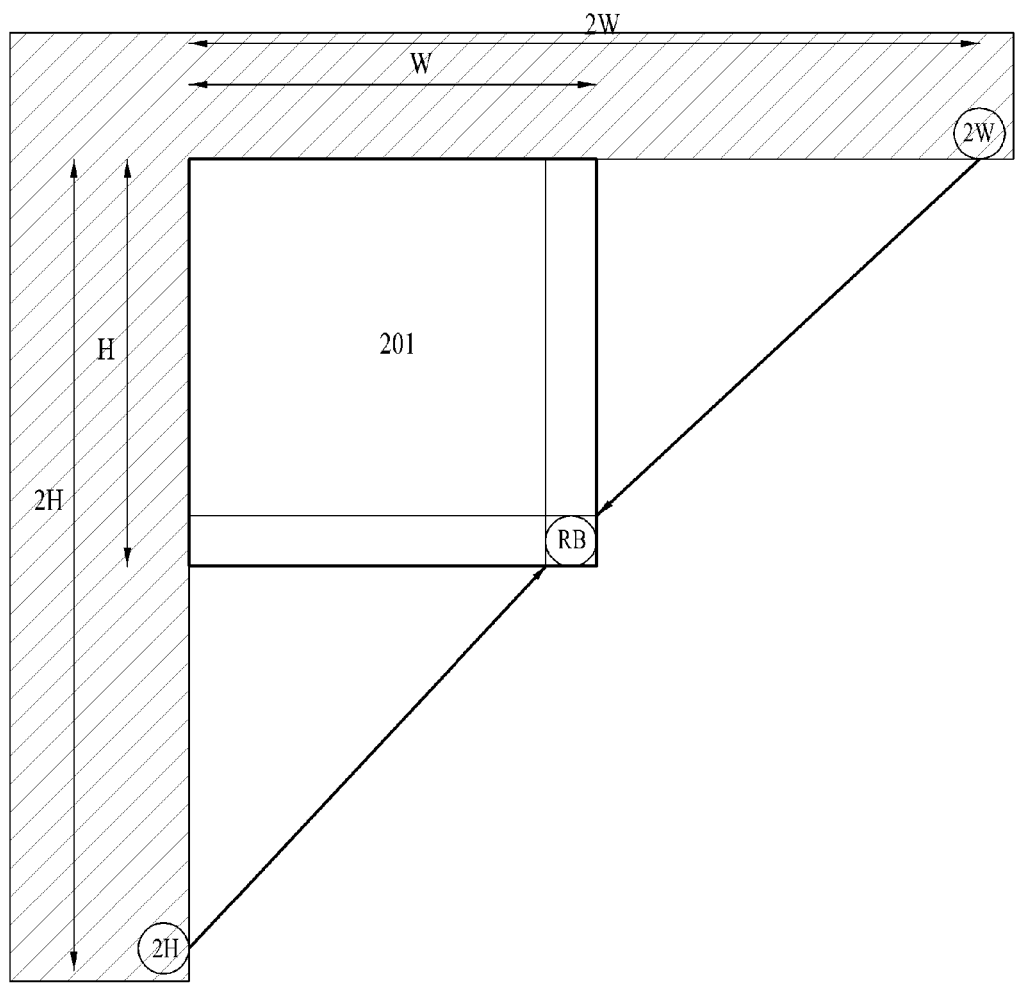
FIG. 2 illustrates a second embodiment for obtaining the first sample of a prediction unit according to the present invention.

FIG. 2 illustrates a second embodiment for predicting a first current prediction sample RB from within a current prediction unit 201 for referencing in the new intra planar mode prediction method according to the present invention. According to this second embodiment, the first current prediction sample RB will be predicted based on an average of a previously reconstructed reference sample 2H and a previously reconstructed reference sample 2W. The reference sample 2H may be taken from either a neighboring left block or a neighboring bottom-left block, depending on the size of the neighboring blocks to the left of the current prediction unit 201. The reference sample 2W may be taken from either a neighboring top block or a neighboring top-right block, depending on the size of the neighboring blocks to the top of the current prediction unit 201. This average sample value for reference samples 2H and 2W will serve as the prediction value for the first current prediction sample RB according to this second embodiment. Now by referencing this prediction for first current prediction sample RB, the remaining samples of the current prediction unit 201 may be predicted. In the case where the reference sample 2H is not available, a reference sample located at distance H within the neighboring left block may be referenced instead of the reference sample 2H for purposes of this second embodiment. In the case where reference sample 2W is not available, a reference sample located at distance W within the neighboring top block may be referenced instead of the reference sample 2W for purposes of this second embodiment.

Figure 3:
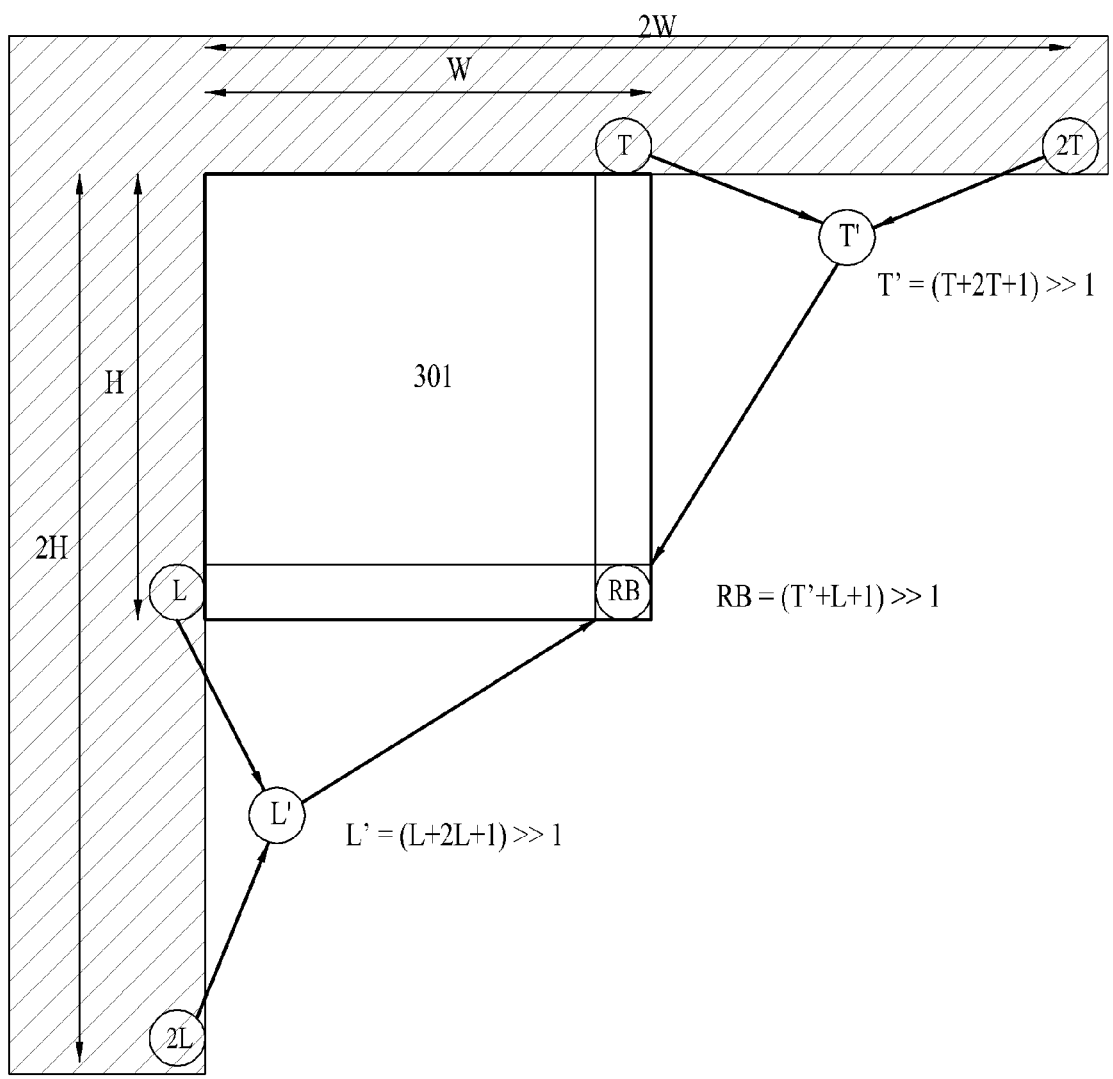
FIG. 3 illustrates a third embodiment for obtaining the first sample of a prediction unit according to the present invention.

FIG. 3 illustrates a third embodiment for predicting a first current prediction sample RB from within a current prediction unit 301 for referencing in the new intra planar mode prediction method according to the present invention. According to this third embodiment, an average of four previously reconstructed reference samples from neighboring blocks will be referenced to predict the first current prediction sample RB. Specifically, reference sample T and reference sample 2T will be referenced to obtain the averaged sample value of T'. While reference sample T is referenced from a neighboring top block, reference sample 2T may be referenced from the same neighboring top block or a separate neighboring top-right block depending on the size of the neighboring top block. Similarly, reference samples L and 2L will be referenced to obtain the averaged sample value of L'. While reference sample L is obtained from a neighboring left block, reference sample 2L may be referenced from the same neighboring left block or a separate bottom-left neighboring block depending on the size of the neighboring left block. Then, the prediction for the first current prediction sample RB will be the average of T' and L' according to this third embodiment. Now by referencing this prediction for first current prediction sample RB, the remaining samples of the current prediction unit 301 may be predicted.

In FIG. 3 the function for determining the average of two reference samples is denoted in terms of a shift function. For example the average of reference samples L and 2L is denoted by:

$$L'=(L+2L+1)>>1$$

According to the above shift function, a value of 1 is added to the sum of reference samples L and 2L in order to account for potential rounding errors, however it is within the scope of the present invention to forgo the plus 1. And the double arrow shift function, >>, represents taking the average of the sum by dividing the sum by two. The remaining calculations for the average sample values for RB and T' illustrated in FIG. 3 that utilize the shift function may be understood to operate in a like manner.

Figure 4:
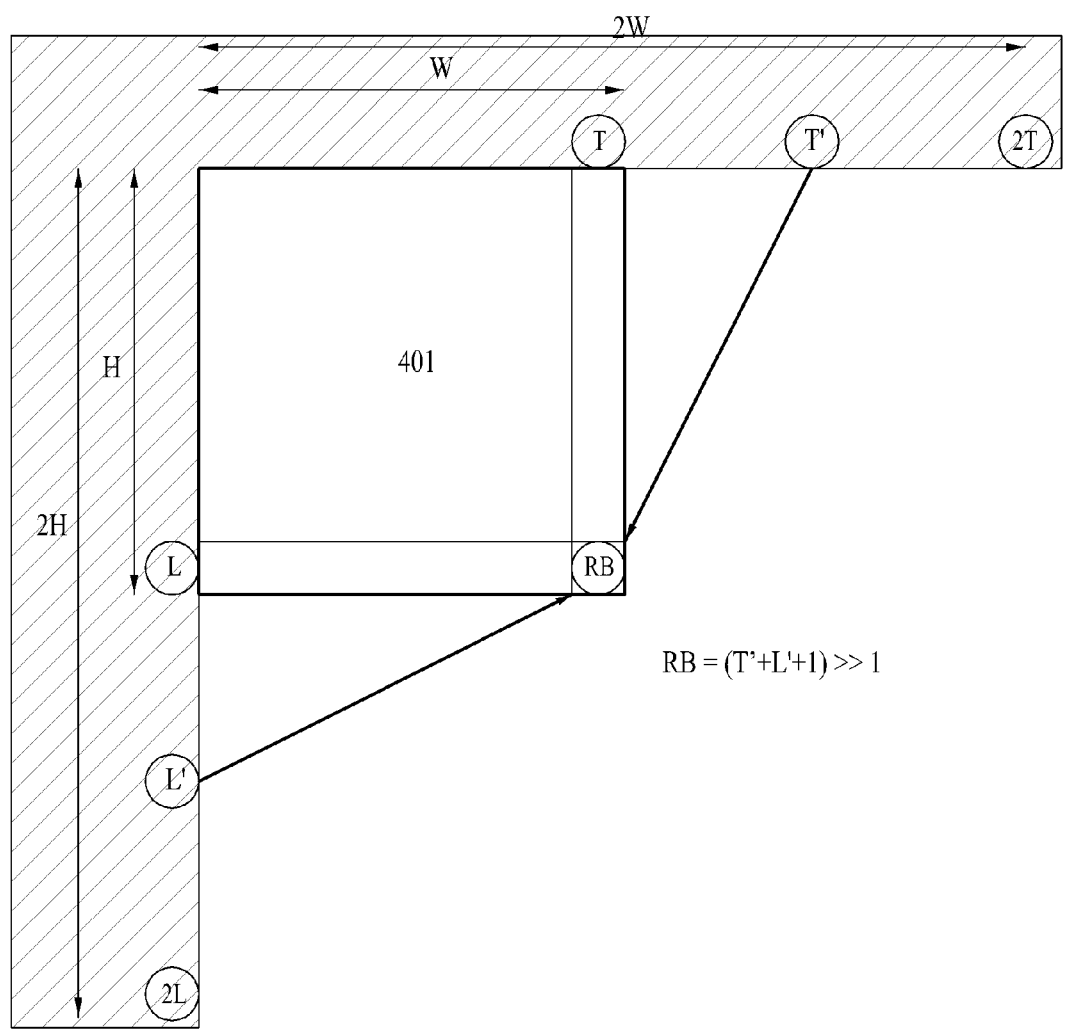
FIG. 4 illustrates a fourth embodiment for obtaining the first sample of a prediction unit according to the present invention.

FIG. 4 illustrates a fourth embodiment for predicting a first current prediction sample RB from within a current prediction unit 401 for referencing in the new intra planar mode prediction method according to the present invention. According to this fourth embodiment, the prediction value for the first prediction sample RB is obtained by referencing two reference samples from neighboring blocks. Specifically, a first reference sample T' is referenced from a neighboring block that may either be a neighboring top block or neighboring top-right block, depending on the size of the neighboring top block. The distinguishing feature of the first reference sample T' is that it is referenced from between previously reconstructed samples T and 2T. A second reference sample L' is referenced from a neighboring block that may either be a neighboring left block or neighboring bottom-left block, depending on the size of the neighboring left block. The distinguishing feature of the second reference sample L' is that it is referenced from a location between previously reconstructed samples L and 2L. The prediction value for the first current prediction sample RB is then obtained from the average of reference samples T' and L'. This is denoted by the shift function in FIG. 4 as:

$$RB=(T'+L'+1)>>1$$

According to the above shift function, a value of 1 is added to the sum of reference samples T' and L' in order to account for potential rounding errors, however it is within the scope of the present invention to forgo the plus one. And the double arrow shift function, >>, represents taking the average of the sum by dividing the sum by two.

After obtaining the prediction value for the first current prediction sample RB by averaging the values for reference samples T' and L', the first current prediction sample RB may be referenced for predicting the remaining samples within the current prediction unit 401 according to the new intra planar mode prediction of the present invention.

Figure 5:
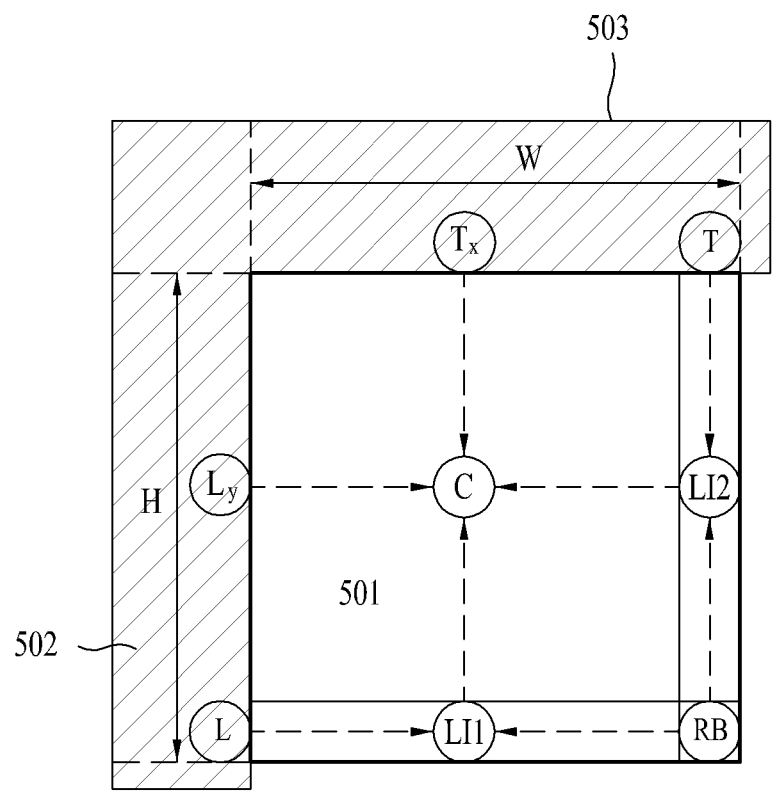
FIG. 5 illustrates a first embodiment for predicting the remaining samples after a first sample has been predicted according to the present invention.

FIG. 5 illustrates a first embodiment for predicting the remaining samples within a current prediction unit 501 after first obtaining the prediction of the first current prediction sample RB. Once the first current prediction sample RB has been predicted according to any of the methods described for the present invention, sample L from the neighboring left block 502 and sample RB from within the current prediction unit 501 will be referenced to perform a linear interpolation. The result from the linear interpolation of reference sample L and reference sample RB is referred to as LI1 in FIG. 5. The resulting prediction value, LI1, from the linear interpolation of reference samples L and RB will then be filled in horizontally as the prediction value for all the current prediction samples that run along the bottom row of current prediction unit 501. These samples that run along the bottom row of current prediction unit 501 may now be referenced for predicting the remaining samples within current prediction unit 501.

Similarly, sample T from the neighboring top block 503 and sample RB from within the current prediction unit 501 will be referenced to perform a linear interpolation. The resulting prediction value from the linear interpolation of reference sample T and reference sample RB is represented in FIG. 5 as LI2. The resulting prediction value, LI2, from the linear interpolation of reference samples T and RB will then be filled in as the prediction value for all the current prediction samples that run vertically along the right-most column of current prediction unit 501. These samples that run vertically along the right-most column of current prediction unit 501 may now be referenced for predicting the remaining samples within current prediction unit 501.

Staying with FIG. 5, the remaining samples within current prediction unit 501 that have not been predicted are predicted by a bi-linear interpolation of four reference samples taken from among previously reconstructed samples from the left neighboring block 502, top neighboring block 503 and from within the current prediction unit 501. For exemplary purposes, FIG. 5 depicts the prediction processing for current prediction sample C. Thus according to this first embodiment, the prediction for current prediction sample C will be the bi-linear interpolation of reference samples $L_y$, LI2, $T_x$ and LI1. It can be seen that reference sample $L_y$ is the previously reconstructed sample from the neighboring left block 502 that is adjacent to the current prediction unit

501 and also shares the same y-coordinate as the current prediction sample C. Reference sample LI2 is the predicted sample from within the current prediction unit 501 that was predicted by the linear interpolation of reference samples L and RB. It can also be seen that reference sample $T_x$ is the previously reconstructed sample from the neighboring top block 503 that is adjacent to the current prediction unit 501 and also shares the same x-coordinate as the current prediction sample C. Reference sample LI1 is the predicted sample from within the current prediction unit 501 what was predicted by the linear interpolation of reference samples L and RB. The bi-linear interpolation of $L_y$, LI2, $T_x$ and LI1 will be processed simultaneously in order to obtain the prediction value for the current prediction sample C. The remaining current prediction samples within the current prediction unit 501 will be predicted according to this first embodiment in a like manner as current prediction sample C.

As an alternative, the bi-linear interpolation of current prediction sample C can also be processed by averaging two separate linear interpolations. According to this alternative, the linear interpolation of reference samples $L_y$ and LI2 will be processed separately from the linear interpolation of reference samples $T_x$ and LI1, and then the prediction for the current prediction sample C will be based on the average of these two linear interpolations. The remaining current prediction samples will be predicted according to this alternative of the first embodiment in a like manner as current prediction sample C.

Figure 6:
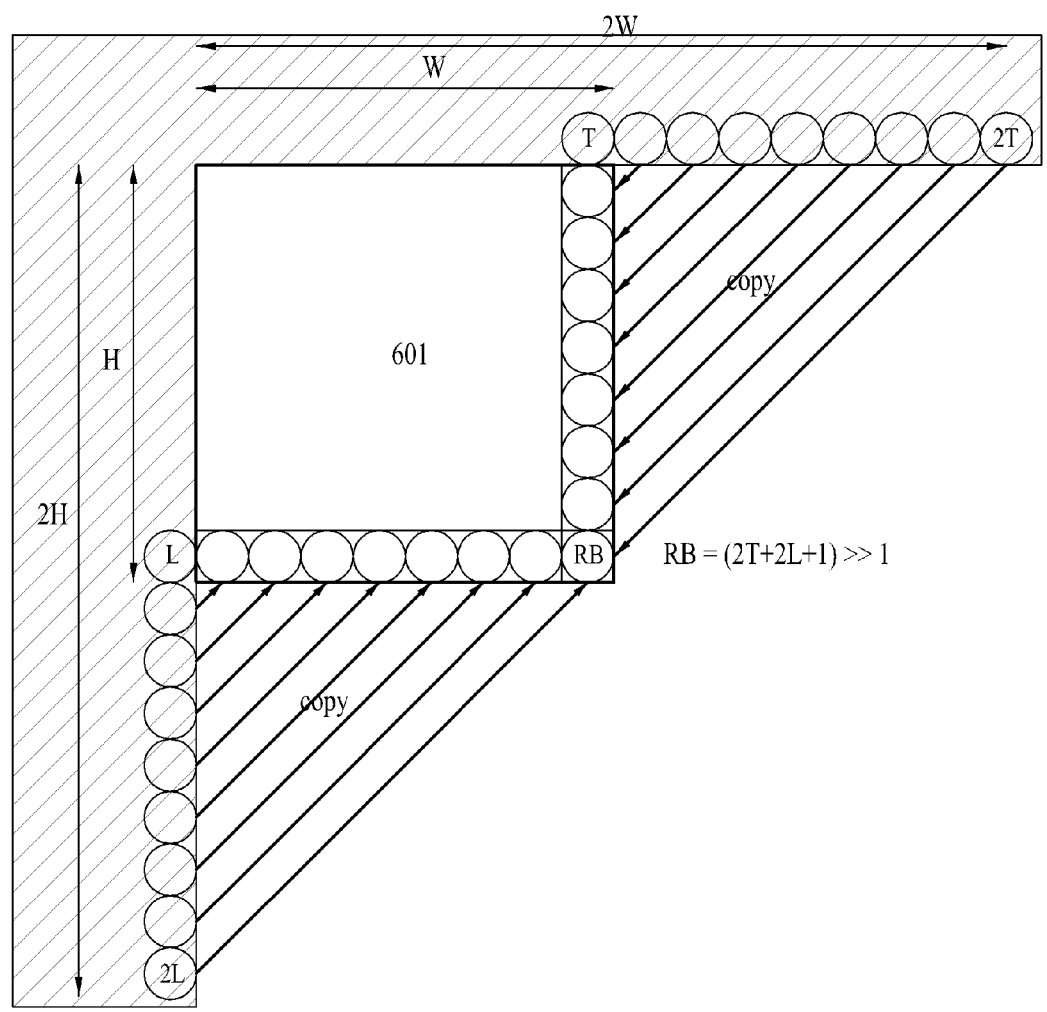
FIG. 6 illustrates a second embodiment for predicting the remaining samples after a first sample has been predicted according to the present invention.

FIG. 6 illustrates a second embodiment for predicting the remaining samples within a current prediction unit 601 after first obtaining the prediction of the first current prediction sample RB. In FIG. 6, it is seen that the first current prediction RB is predicted by taking the average of reference sample 2L and reference sample 2T. After having predicted the first current prediction sample RB, the remaining current prediction samples along the bottom row of the current prediction unit 601 are copied from the neighboring block as depicted in FIG. 6. The reference samples referenced to copy the bottom row of the current prediction unit 601 may come from either a neighboring left block or neighboring bottom-left block in relation to the current prediction unit 601, depending on the size of the neighboring left block. Similarly, the remaining current prediction samples along the right-most vertical column of the current prediction unit 601 are copied from the neighboring block as depicted in FIG. 6. The reference samples referenced to copy the rightmost vertical column in the current prediction unit 601 may come from either a neighboring top block or neighboring top-right block, depending on the size of the neighboring top block.

Figure 7:
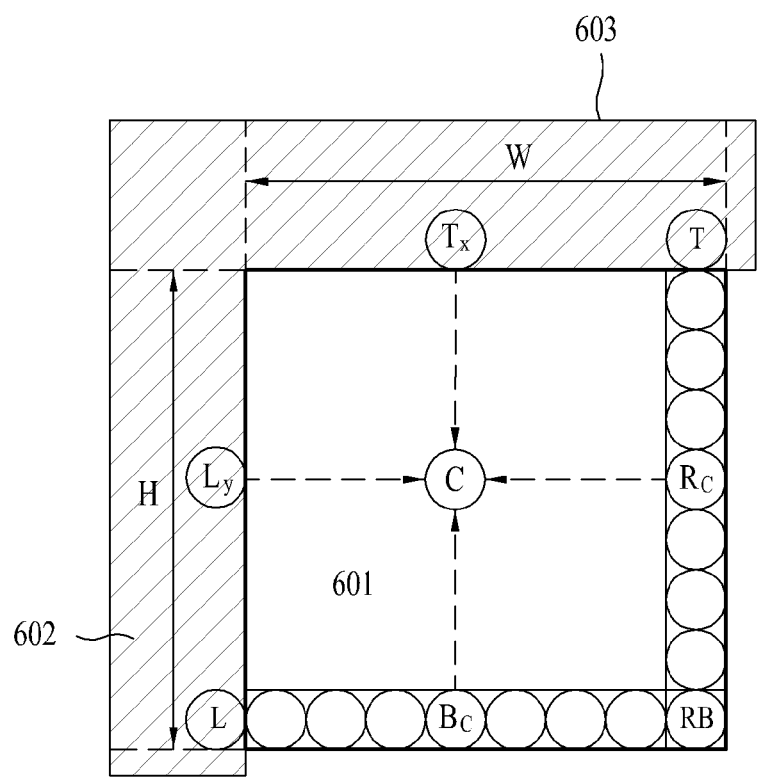
FIG. 7 illustrates an enlarged view of a portion taken from FIG. 6.

FIG. 7 is a close up view of the current prediction unit 601 seen in FIG. 6. After predicting the samples along the bottom row and right-most vertical column of the current prediction unit 601 by copying the samples from the neighboring blocks as seen in FIG. 6, the remaining samples within current prediction unit 601 are predicted according to a bi-linear interpolation. The bi-linear interpolation is processed by referencing four samples taken from among the left neighboring block 602, top neighboring block 603 and from within the current prediction unit 601. For exemplary purposes, FIG. 7 depicts the prediction processing for current prediction sample C. Thus according to this second embodiment, the prediction for current prediction sample C will be the bi-linear interpolation of reference samples $L_y$, $R_C$, $T_x$ and $B_C$. Reference sample $L_y$ is a sample from the neighboring left block 602 that is adjacent to the current prediction unit 601 and is also on the same y-coordinate line as the current prediction sample C. Reference sample $R_C$ is a sample from within the current prediction sample 601 that has been predicted by copying a reference sample from a neighboring block as explained with reference to FIG. 6 above, and is also on the same y-coordinate line as the current prediction sample C. Reference sample $T_x$ is a sample from the neighboring top block 603 that is adjacent to the current prediction unit 601 and is also on the same x-coordinate line as the current prediction sample C. Reference sample $B_C$ is a sample from within the current prediction sample 501 that has been predicted by copying a reference sample from a neighboring block as explained in reference to FIG. 6 above, and is also on the same x-coordinate line as the current prediction sample C. The bi-linear interpolation of $L_y$, $R_C$, $T_x$ and $B_C$ will be processed simultaneously in order to obtain the prediction value for the current prediction sample C. The remaining current prediction samples will be predicted according to this second embodiment in a like manner as current prediction sample C.

As an alternative, the bi-linear interpolation of current prediction sample C can also be processed by averaging two separate linear interpolations. According to this alternative, the linear interpolation of reference samples $L_y$ and $R_c$ will be processed separately from the linear interpolation of reference samples $T_x$ and $B_c$, and then the prediction for the current prediction sample C will be based on the average of these two linear interpolations. The remaining current prediction samples will be predicted according to this alternative of the second embodiment in a like manner.

Figure 8:
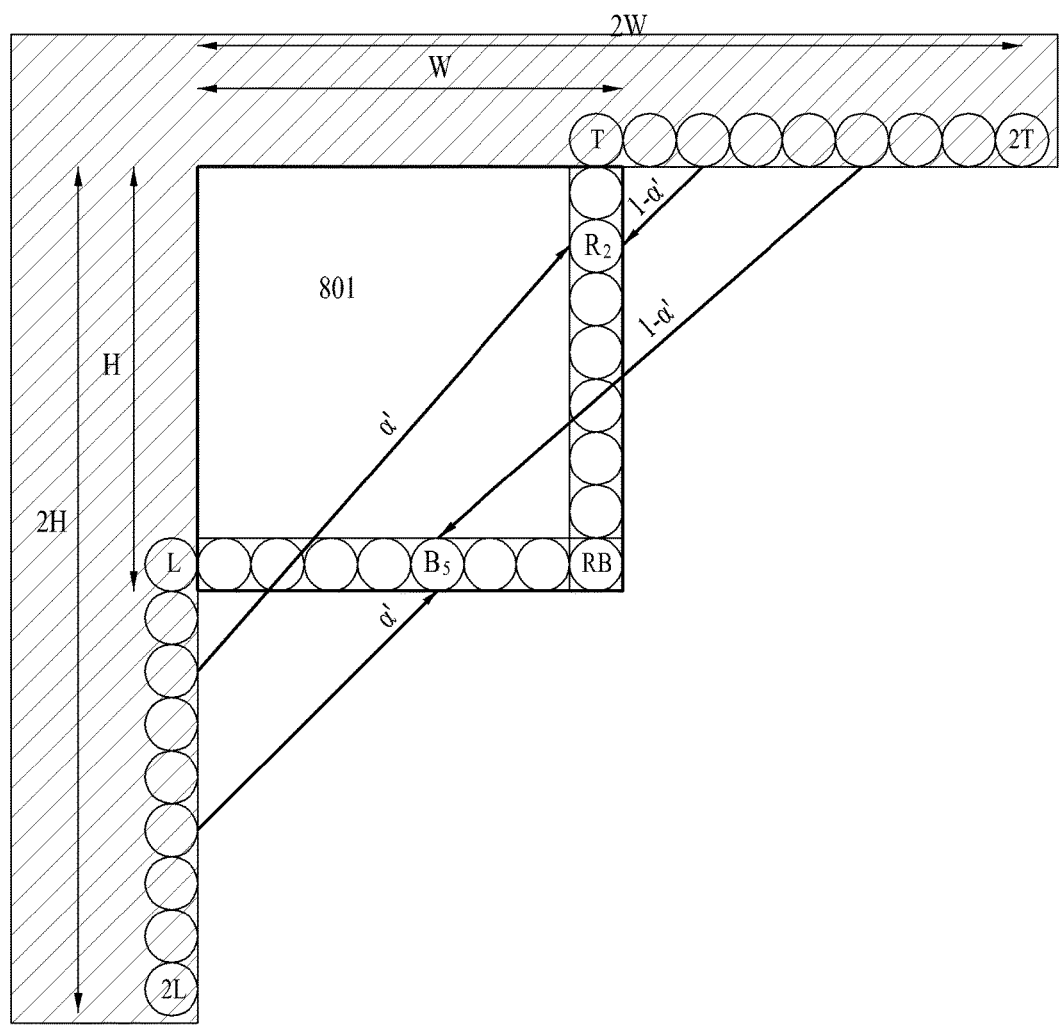
FIG. 8 illustrates a third embodiment for predicting the remaining samples after a first sample has been predicted according to the present invention.

FIG. 8 illustrates a third embodiment for predicting the remaining samples within a current prediction unit 801 after first obtaining the prediction of the first current prediction sample RB. After having predicted the first current prediction sample RB according to any one of the previously mentioned embodiments above, the remaining current prediction samples that belong to the bottom row of the current prediction unit 801 are filled by utilizing a linear interpolation of two reference samples referenced from two neighboring blocks. For exemplary purposes, the instance for predicting current prediction sample $B_5$ will be described as an exemplary instance for predicting the samples along the bottom row of the current prediction unit 801. It can be seen from FIG. 8 that the two reference samples referenced to predict current prediction sample $B_5$ lie along a common angular line and also come from two separate neighboring blocks. The first reference sample, as indicated by the arrow α, is referenced from either a neighboring left block or neighboring bottom-left block, depending on the size of the neighboring left block. The second reference sample, as indicated by the arrow 1-α, is referenced from either a neighboring top block or neighboring top-right block, depending on the size of the neighboring top block. Thus the first reference sample and the second reference sample will be linearly interpolated to obtain a prediction value for current prediction sample $B_5$. The remaining current prediction samples along the bottom row of the current prediction unit 801 will be predicted in a similar manner by referencing two separate reference samples that lay along a corresponding angular line. Predicted current prediction samples may then be referenced when predicting the remaining samples within the current prediction unit 801.

Also depicted in FIG. 8 is the prediction method for the right-most vertical column of samples within the current prediction unit 801 according to this third embodiment. For exemplary purposes, the instance of predicting current prediction sample $R_2$ will be described as an exemplary instance for predicting the samples along the rightmost vertical column of the current prediction unit 801. It can be seen from FIG. 8 that the two reference samples referenced to predict current prediction sample $R_2$ lie along a common angular line and also come from two separate neighboring blocks. The first reference sample, as indicated by the arrow α, is referenced from either a neighboring left block or neighboring bottom-left block, depending on the size of the left block. The second reference sample, as indicated by the arrow 1-α, is referenced from either a neighboring top block or neighboring top-right block, depending on the size of the top block. Thus the first reference sample and the second reference sample will be linearly interpolated to obtain a prediction value for current prediction sample $R_2$. The remaining samples along the right-most vertical column of the current prediction unit 801 will be predicted in a similar manner by referencing two separate reference samples that lay along a corresponding angular line. Predicted current prediction samples may then be referenced when predicting the remaining samples within the current prediction unit 801.

Figure 9:
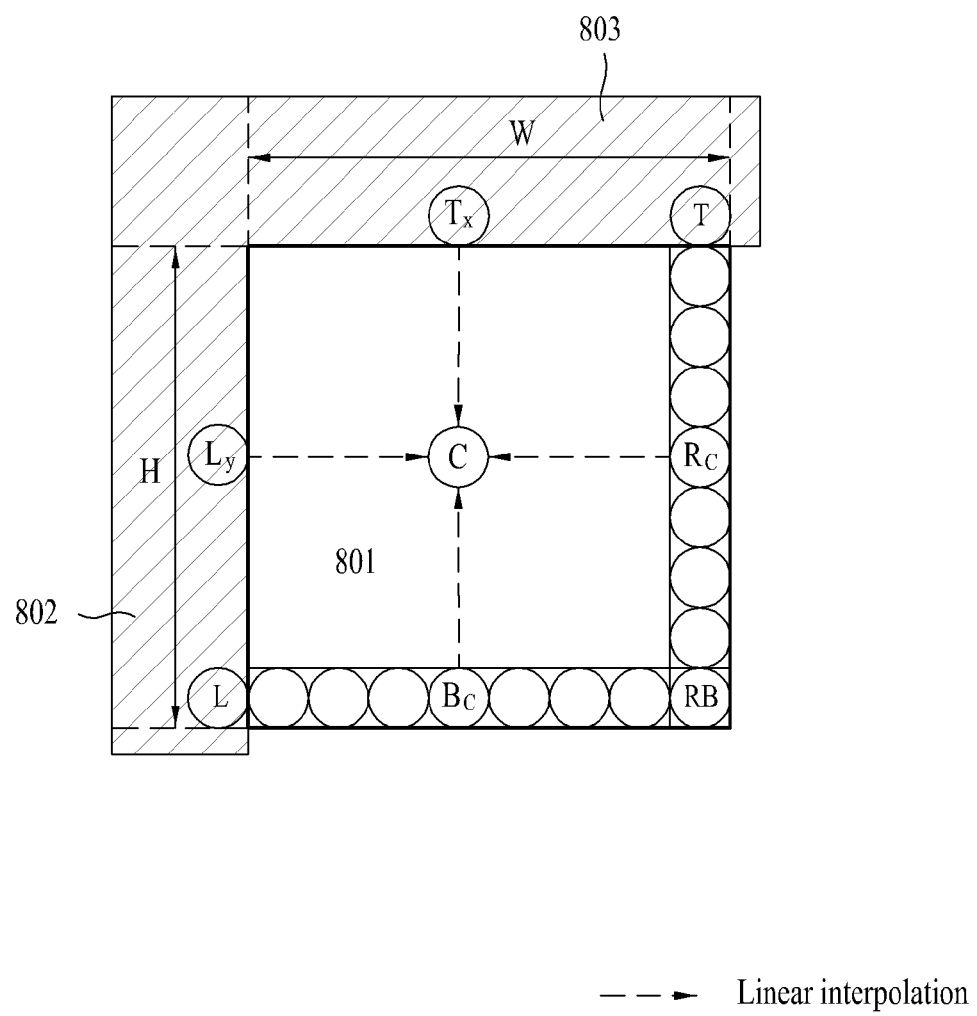
FIG. 9 illustrates an enlarged view of a portion taken from FIG. 8.

FIG. 9 is a close up view of the current prediction unit 801 seen in FIG. 8 where the samples along the bottom row and the samples along the right-most vertical column have been predicted. The remaining samples within current prediction unit 801 that have not been predicted are predicted by a bi-linear interpolation of four reference samples taken from among previously reconstructed samples from the left neighboring block 802, top neighboring block 803 and from within the current prediction unit 801. For exemplary purposes, FIG. 9 depicts the instance for prediction processing of the current prediction sample C. Thus according to this third embodiment, the prediction for current prediction sample C will be the bi-linear interpolation of reference samples $L_y$, $R_C$, $T_x$ and $B_C$. Reference sample $L_y$ is a sample from the neighboring left block 802 that is adjacent to the current prediction unit 801 and is also on the same y-coordinate line as the current prediction sample C. Reference sample $R_C$ is a sample from within the current prediction sample 801 that has been predicted based on the linear interpolation of two samples from neighboring blocks that lay along a common angular line as explained with reference to FIG. 8 above, and is also on the same y-coordinate line as the current prediction sample C. Reference sample $T_x$ is a sample from the neighboring top block 803 that is adjacent to the current prediction unit 801 and is also on the same x-coordinate line as the current prediction sample C. Reference sample $B_c$ is a sample from within the current prediction sample 801 that has been predicted by the linear interpolation of two samples from neighboring blocks that lay along a common angular line as explained in reference to FIG. 8 above, and is also on the same x-coordinate line as the current prediction sample C. The bi-linear interpolation of $L_y$, $R_c$, $T_x$ and $B_c$ will then be processed simultaneously in order to obtain the prediction value for the current prediction sample C. The remaining current prediction samples will be predicted according to this third embodiment in a like manner as current prediction sample C.

As an alternative, the bi-linear interpolation of current prediction sample C can also be processed by separately taking the linear interpolation of reference samples $L_y$ and $R_C$ and taking the linear interpolation of reference samples $T_x$ and $B_C$, and then taking the average of these two linear interpolations. The remaining current prediction samples will be predicted according this alternative to the third embodiment in a like manner.

Figure 10:
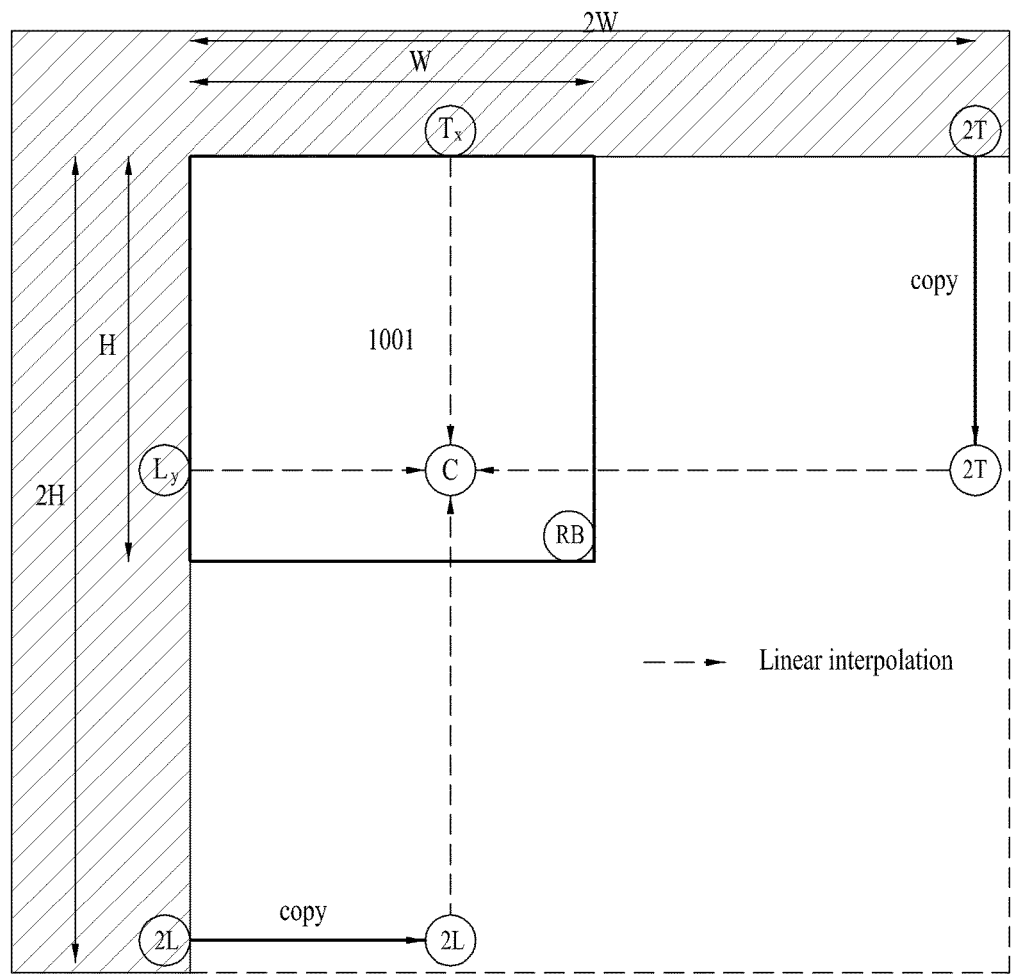
FIG. 10 illustrates a fourth embodiment for predicting the remaining samples after a first sample has been predicted according to the present invention.

FIG. 10 illustrates a fourth embodiment for predicting the remaining samples within a current prediction unit 1001 after first obtaining the prediction of the first current prediction sample RB. After having predicted the first current prediction sample RB according to any one of the previously mentioned embodiments above, all remaining current prediction samples that belong to the current prediction unit 1001 are filled/predicted by utilizing a bi-linear interpolation of four reference samples referenced from neighboring blocks. Therefore there is no need to separately calculate a prediction for the current prediction samples that lay along the bottom row of the current prediction unit 1001 and the current prediction samples that lay along the rightmost vertical column of current prediction unit 1001. For exemplary purposes, FIG. 10 depicts the prediction processing for current prediction sample C according to this fourth embodiment.

In order to process the prediction for the current prediction sample C, a bi-linear interpolation of four reference samples will be made: $L_y$, 2T, $T_x$, and 2L. Reference sample $L_y$ is a sample from a neighboring left block that is adjacent to the current prediction unit 1001 and is also on the same y-coordinate line as the current prediction sample C. Reference sample 2T is simply a copy of the previously reconstructed reference sample 2T taken from either a neighboring top block or neighboring top-right block. Reference sample $T_x$ is a sample from a neighboring top block that is adjacent to the current prediction unit 1001 and is also on the same x-coordinate line as the current prediction sample C. Reference sample 2L is simply a copy of the previously reconstructed reference sample 2L taken from either a neighboring left block or neighboring bottom-left block. The bi-linear interpolation of $L_y$, 2T, $T_x$, and 2L will then be processed simultaneously in order to obtain the prediction value for the current prediction sample C. The remaining current prediction samples will be predicted according to this fourth embodiment in a like manner as current prediction sample C.

It is noted that according to this fourth embodiment, reference samples 2L and 2T will remain constant for each bi-linear interpolation made for predicting a current prediction sample within the current prediction unit 1001. However the reference samples $L_y$ and $T_x$ will vary to correspond to the x and y coordinates of the current prediction sample being predicted.

As a first alternative of this fourth embodiment, the bi-linear interpolation can also be processed as the average of two separate linear interpolations. According to this first alternative, the first linear interpolation is taken by referencing samples $L_y$ and 2T. And the second linear interpolation is taken by referencing samples $T_x$ and 2L. Then prediction for current prediction sample C will be the resulting average from the first linear interpolation of samples $L_y$ and 2T and the second linear interpolation of samples $T_x$ and 2L. The remaining current prediction samples may be predicted according to this alternative of the fourth embodiment in a like manner.

In a second alternative to this fourth embodiment, after predicting the first current prediction sample RB and prior to predicting the current prediction sample C, the current prediction samples that lay in the bottom row of the current prediction unit 1001 may be padded with copies of 2L. And similarly, the current prediction samples that lay in the right-most column of the current prediction unit 1001 may be padded with copies of 2T.

Figure 11:
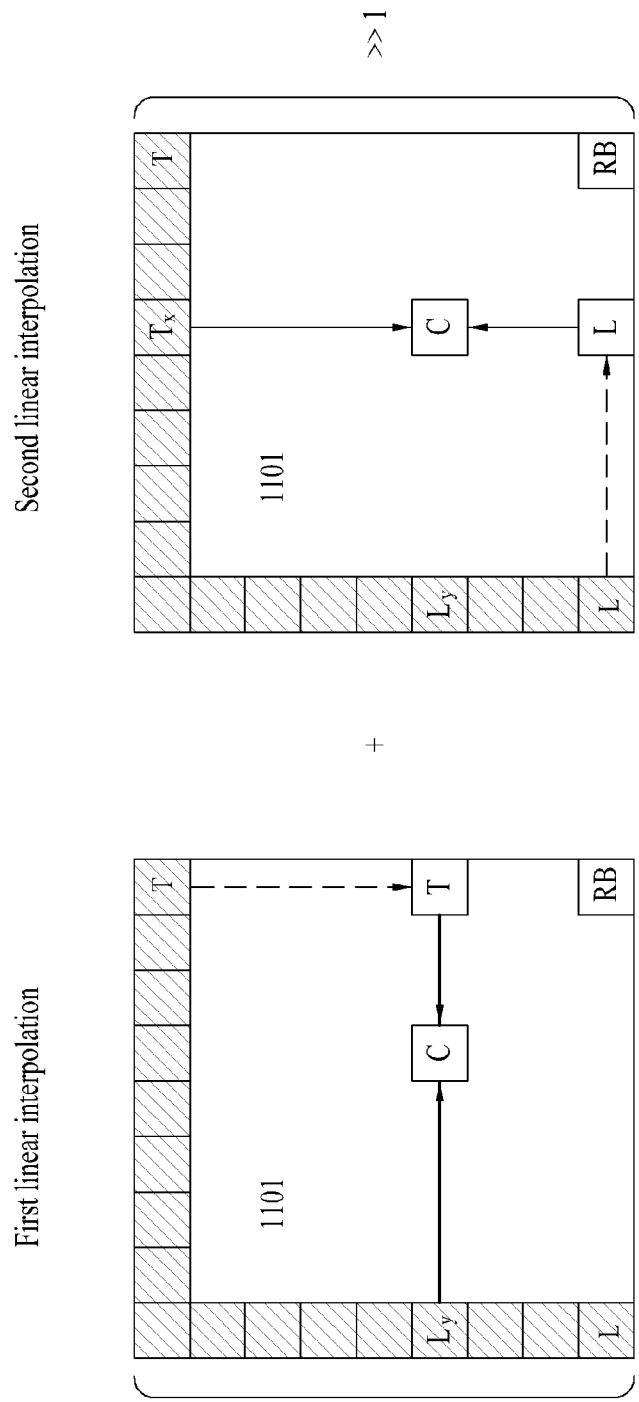
FIG. 11 illustrates a fifth embodiment for predicting the remaining samples after a first sample has been predicted according to the present invention.

FIG. 11 illustrates a fifth embodiment for predicting the remaining samples within a current prediction unit 1101 after first obtaining the prediction of the first current prediction sample RB. After having predicted the first current prediction sample RB according to any one of the methods of the present invention, all remaining current prediction samples within the current prediction unit 1101 are predicted by averaging a first linear interpolation of two previously reconstructed reference samples and a second linear interpolation of two previously reconstructed reference samples from neighboring blocks.

In FIG. 11, the first linear interpolation is made by referencing previously reconstructed reference sample $L_y$ that is referenced from a neighboring left block that is at the same y-coordinate as the current prediction sample C, and referencing sample T which is a copy of the previously reconstructed sample T from a neighboring top block that is adjacent to the top-right sample from the current prediction unit 1101. The second linear interpolation is made by referencing previously reconstructed sample $T_x$ from a neighboring top block that is at the same x-coordinate as the current prediction sample C, and referencing sample L which is a copy of the previously reconstructed sample L from a neighboring left block that is adjacent to the bottom-left sample of the current prediction unit 1101.

The first linear interpolation is added to the second linear interpolation and then averaged to obtain the prediction for the current prediction sample C. The averaging function is graphically represented by the shift-right function, >>, in FIG. 11. The prediction for current prediction sample C is then the average of the first linear interpolation and the second linear interpolation. The remaining samples will be predicted in a similar manner. The first linear interpolation will always reference the copied sample T from the neighboring top block, and then variably reference a previously reconstructed sample $L_y$ from the neighboring left block that has the same y-coordinate as the current prediction sample C. And the second linear interpolation will always reference the copied sample L from the neighboring left block, and then variably reference a previously reconstructed sample $T_x$ from the neighboring top block that has the same x-coordinate as the current prediction sample C.

In an alternative of this fifth embodiment, after predicting the first current prediction sample RB and prior to predicting the current prediction sample C, the current prediction samples that lay in the bottom row of the current prediction unit 1101 may be padded with copies of reference sample L. And similarly, the current prediction samples that lay in the rightmost column of the current prediction unit 1101 may be padded with copies of reference sample T.

Figure 12:
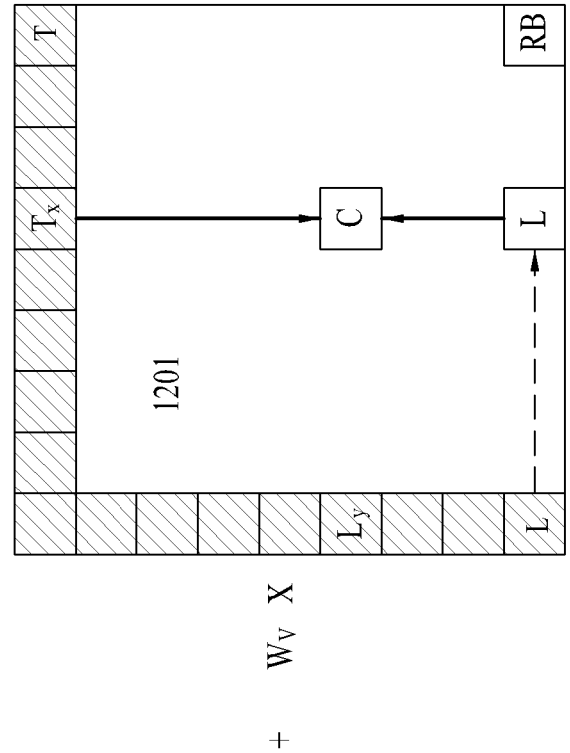
FIG. 12 illustrates a sixth embodiment for predicting the remaining samples after a first sample has been predicted according to the present invention.
Figure 12:
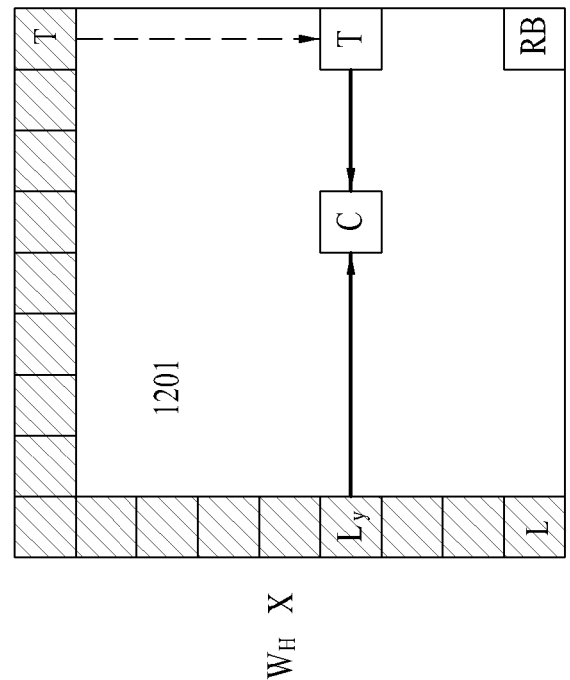

FIG. 12 illustrates a sixth embodiment for predicting the remaining samples within a current prediction unit 1201 after first obtaining the prediction of the first current prediction sample RB. After having predicted the first current prediction sample RB according to any one of the methods of the present invention, all remaining current prediction samples within the current prediction unit 1201 will be predicted based on a combination of two weighted linear interpolations.

In FIG. 12, the first linear interpolation is processed by referencing previously reconstructed reference sample $L_y$ referenced from a neighboring left block that is at the same y-coordinate as the current prediction sample C, and referencing reference sample T which is a copy of the previously reconstructed sample T from a neighboring top block that is adjacent to the top-right sample of the current prediction unit 1201. The second linear interpolation is processed by referencing previously reconstructed sample $T_x$ from a neighboring top block that is at the same x-coordinate as the current prediction sample C, and reference sample L which is a copy of the previously reconstructed sample L from a neighboring left block that is adjacent to the bottom-left sample of the current prediction unit 1201.

Now each of the first linear interpolation and second linear interpolation will be assigned their own weighting values. FIG. 12 illustrates that the first linear interpolation will be weighted by the first weighting value $W_H$, and the second linear interpolation will be weighted by the second weighting value $W_V$. Therefore, the prediction for the current prediction sample C, $P_c$, will be the sum:

$$P_c = W_H \times (\text{First Linear Interpolation}) + W_V \times (\text{Second Linear Interpolation})$$

Assuming that the current prediction sample C has the coordinates (x,y) within the current prediction unit 1201, then the prediction for the current prediction sample C, $P_C(x,y)$, will follow the equation below:

$$P_C(x, y) = \frac{y+1}{x+y+2} \text{ (First Linear Interpolation)} + \frac{x+1}{x+y+2} \text{ (Second Linear Interpolation)}$$

According to the above equation, the value for $W_H$ that will be applied to the First Linear Interpolation is, $$\frac{y+1}{x+y+2}.$$

And the value for $W_V$ that will be applied to the Second Linear Interpolation is $$\frac{x+1}{x+y+2}.$$

In an alternative of this sixth embodiment, after predicting the first current prediction sample RB and prior to predicting the current prediction sample C, the current prediction samples that lay in the bottom row of the current prediction unit 1201 may be padded with copies of reference sample L. And similarly, the remaining current prediction samples that lay in the right-most column of the current prediction unit 1201 may be padded with copies of reference sample T.

Figure 13:
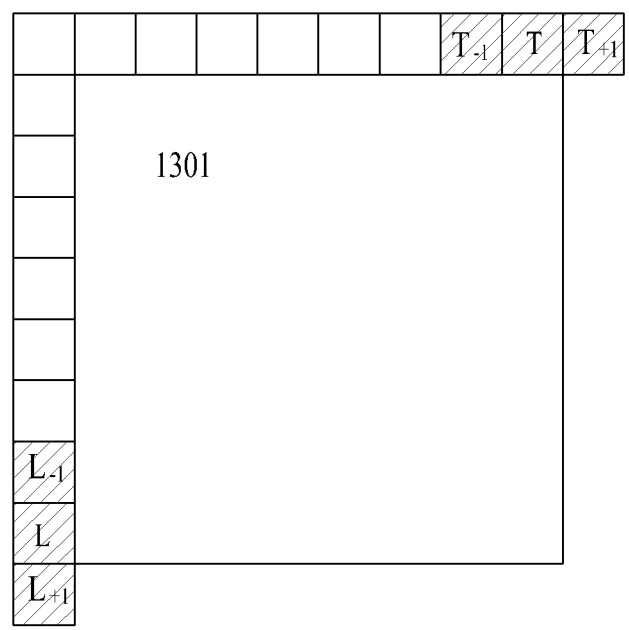
FIG. 13 illustrates a method for filtering certain reference samples that are determined to be important according to the present invention.

FIG. 13 illustrates a new method for filtering certain samples that neighbor a current prediction unit, where the samples selected for filtering may be referenced when processing the new intra planar mode predictions according to the present invention. Typically the neighboring sample T that is adjacent to the top-right sample of the current prediction unit 1301 will be one of the samples to be prominently referenced during the new intra planar mode prediction. Also, typically the neighboring sample L that is adjacent to the bottom-right sample of the current prediction unit 1301 will be the other reference sample to be prominently referenced during the new intra planar mode prediction. Therefore, there is a desire to prioritize the two reference samples T and L. So as a method for prioritizing the reference samples T and L, the present invention offers the solution of processing reference samples T and L through a filtering process in order to increase the smoothness of the resulting predicted samples within the current prediction unit 1301, as well as increasing the efficiency of the overall video signal compression.

Accordingly, FIG. 13 is a graphical illustration of processing the reference samples T and L through a 1:2:1 filtering process. To accomplish the filtering process according to the present invention, previously reconstructed samples that are adjacent to the reference samples T and L will also be utilized. For example, sample $T_{-1}$ that is adjacent to the left of reference sample T, and $T_{+1}$ that is adjacent to the right of reference sample T are highlighted in FIG. 13. Also, sample $L_{-1}$ that is adjacent to the top of reference sample L, and $L_{+1}$ that is adjacent to the bottom of reference sample L are highlighted in FIG. 13. The reference samples that result from the filtering process of reference samples T and L will be referred to as T' and L' respectively. It is then these filtered samples T' and L' that will actually be referenced when predicting the samples within the current prediction unit 1301 according to the new intra planar modes of the present invention.

The 1:2:1 filtering process applied to reference sample T is processed according to the following equation:

$$T' = \frac{(1 \times T_{-1}) + (2 \times T) + (1 \times T_{+1}) + 2}{4}$$

Because at the most basic level of digital data, the actual sample value is represented by a string of binary bits, the above equation may be written in terms of shift functions in the binary bits that represent the value for the reference sample T. This equation that is written in terms of shift functions may be written as the following:

$$T' = \{T_{-1} + (T<<1) + T_{+1} + 2\} >> 2$$

Referring to the above equation written in terms of the shift functions, the (<<1) left-shift represents a single shift to the left, which is mathematically understood to be equivalent to doubling or multiplying by two. The (>>2) right-shift represents two shifts to the right, which is mathematically understood to be equivalent to dividing by four.

Similarly, the 1:2:1 filtering process applied to reference sample L is processed according to the following equation:

$$L' = \frac{(1 \times L_{-1}) + (2 \times L) + (1 \times L_{+1}) + 2}{4}$$

This equation may also be represented in terms of the shift functions by the following:

$$L' = \{L_{-1} + (L<<1) + L_{+1} + 2\} >> 2$$

After processing the filtering for the reference samples L and T, the new filtered values L' and T' will replace the original reference samples L and T. By doing so, the new filtered reference samples L' and T' may be referenced when processing the new intra planar mode prediction on the current prediction unit 1301.

If, however, one of the samples that are adjacent to the reference samples T and L are not available, then the value for the reference sample will need to be weighted to a greater degree. For example if sample $T_{+1}$ that is adjacent to the right of reference sample T is not available, reference sample T may undergo a 1:3 filtering process that may be processed according to the following equation:

$$T' = \frac{(1 \times T_{-1}) + (3 \times T) + 2}{4}$$

It is evident from the revised filtering equation that the value for reference sample T is weighted three times, as opposed to the original two times, in order to compensate for the sample $T_{+1}$ that is not available. This new filtering process in terms of the shift function may be written as follows:

$$T' = \{T_{-1} + (T<<1) + T + 2\} >> 2$$

Similarly, if the sample $T_{-1}$ that is adjacent to the left of reference sample T is not available, then reference sample T may undergo a 3:1 filtering process that may be processed according to the following equation:

$$T' = \frac{(3 \times T) + (1 \times T_{+1}) + 2}{4}$$

This new filtering process in terms of the shift function may be written as follows:

$$T' = \{(T<<1) + T + T_{+1} + 2\} >> 2$$

The same type of compensation filtering processing may be applied for filtering reference sample L when either one of the adjacent samples $L_{+1}$ or $L_{-1}$ are not available.

Referencing the new filtered reference samples L' and T' will result in smoother predictions for samples within the current prediction unit 1301, as well as increase the compression efficiency for the digital video signal.

All of the embodiments described thus far have called for the bottom-right sample within a current prediction unit to be the first prediction sample to be predicted after it has been received by a decoding unit. However, according to an alternative aspect of the present invention, an encoding unit that initially encodes an original video signal into the prediction units of video data may keep one of the samples within a prediction unit that is predicted according to the new intra planar mode of the present invention, in a reconstructed state. By then transmitting the first prediction sample in a reconstructed state, this frees the decoding unit from the task of performing a prediction to obtain this first prediction sample for referencing during the new intra planar mode prediction. This first prediction sample has been described above to be necessary for the interpolation processing required for the new intra planar mode predictions according to the present invention.

In addition, this alternative aspect of the present invention also allows for this first prediction value that is transmitted as a reconstructed sample, to be located at any point within the prediction unit. While previous examples have always envisioned this first prediction sample within the prediction unit to be located at the bottom-right corner of the prediction unit, this alternative aspect of the present invention allows for this first prediction sample to be located at any location.

Figure 14:
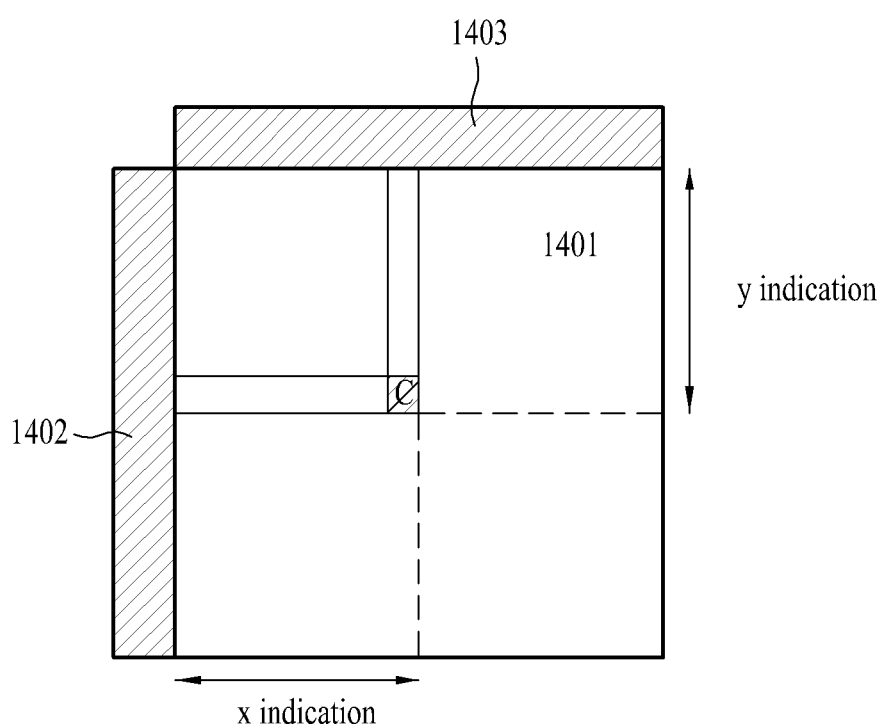
FIG. 14 illustrates an example for processing a first sample of a prediction unit according to the present invention.

For exemplary purposes, FIG. 14 illustrates the first current prediction sample C being shaded gray to indicate it has been received by a decoding unit in the reconstructed state. Also, the samples from the neighboring left block 1402 and neighboring top block have been shaded gray to indicate that they have been previously reconstructed by the decoding unit. The first current prediction sample C transmitted in the reconstructed state may also be accompanied by coordinate information indicating the location of the first current prediction sample C within the current prediction unit 1401. If the coordinates of the first current prediction sample C that is transmitted in the reconstructed state is not included in the video signal as part of identifying information, then the decoding unit has a variety of options for determining the coordinates.

Figure 15:
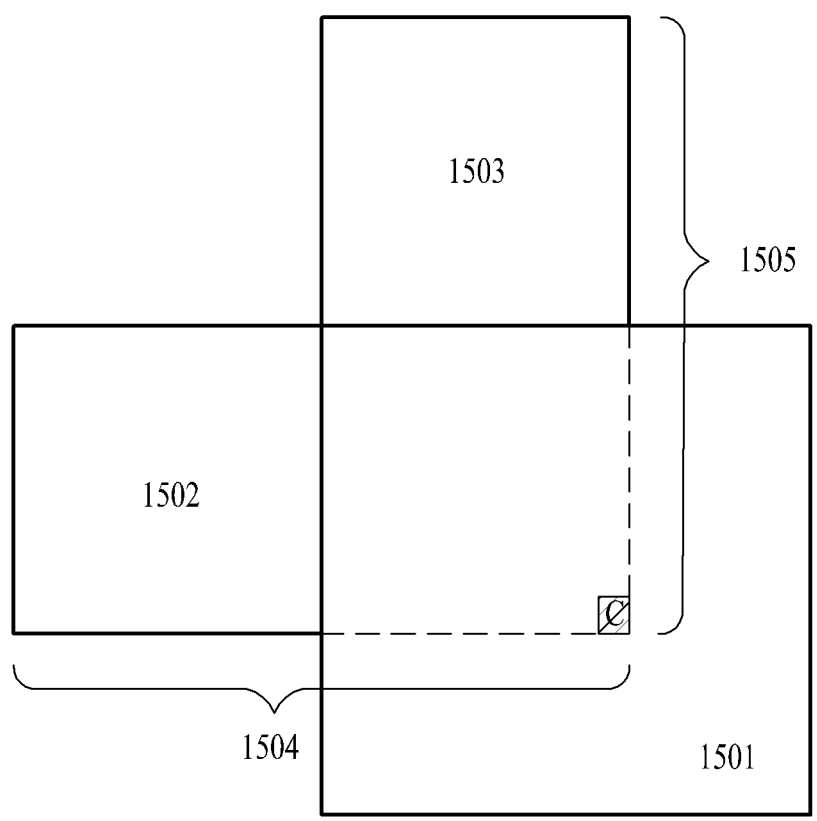
FIG. 15 illustrates an example for determining the location for a first sample of a prediction unit according to the present invention.

Typically, at the encoding unit side where the original video signal is encoded into the prediction units, if information identifying the location of the first prediction sample to be transmitted in a reconstructed state is not included with the transmitted video signal, then the encoding unit will coincide the location of the first prediction sample to run along the edges of neighboring blocks. This is a desirable practice because there are a variety of methods for a decoding unit that receives the prediction units to detect these edges. This practice can be seen from the illustration in FIG. 15 where the encoding unit will select a location for the first prediction sample C to coincide with the edges 1504 and 1505. The edges are essentially the edges of the neighboring blocks that are adjacent to the prediction unit 1501. So edge 1504 is the edge of neighboring left block 1502, and the edge 1505 is the edge from neighboring top block 1503. These edges are formed due to the partition of neighboring blocks into sizes that are smaller than the prediction unit 1501. So if the encoding unit does not expressly transmit information identifying the location for the prediction sample C that is transmitted in a reconstructed state within the video signal, the encoding unit must select a location within the prediction unit that may be easily identifiable by the decoding unit. The edges of neighboring blocks offer such a marking point that may be easily identifiable by the receiving decoding unit. So the encoding unit will base the coordinates of the first prediction sample to correspond to these neighboring edges because each edge point where one block ends and the next block starts can be easily detected by the decoding unit that receives the video signal including the prediction unit 1501.

Figure 16:
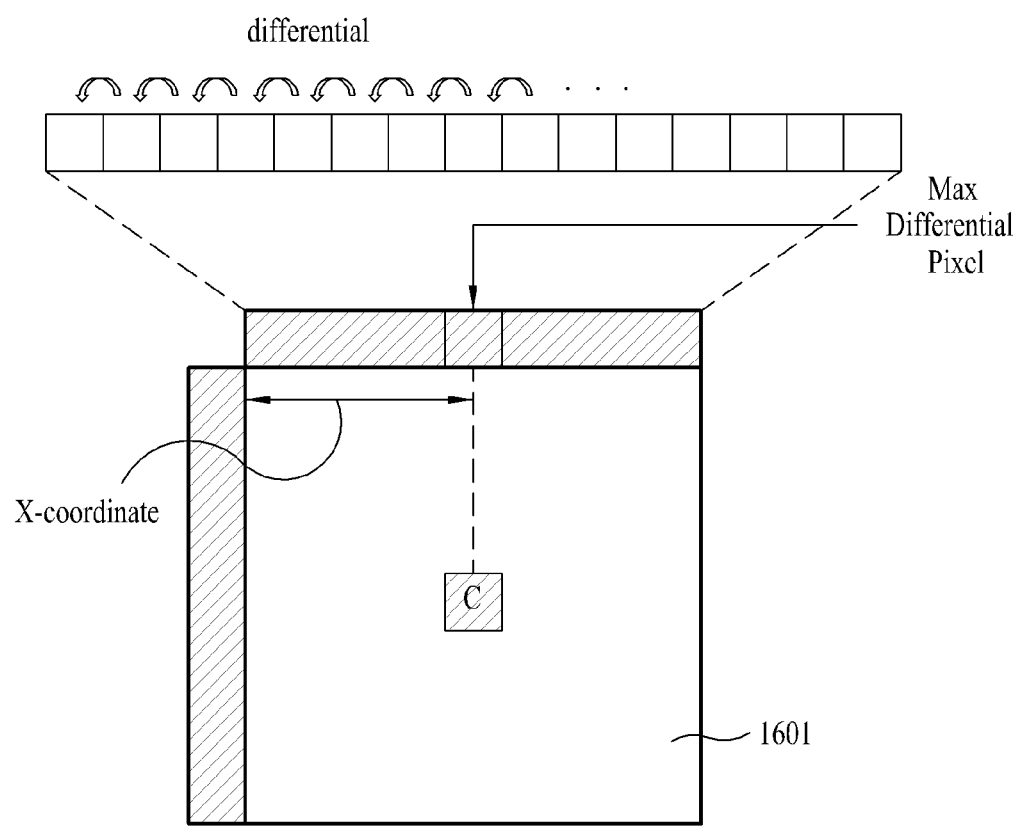
FIG. 16 illustrates another example for determining the location for a first sample of a prediction unit according to the present invention.

FIG. 16 illustrates one method of how a decoding unit may detect an edge. The method illustrated in FIG. 16 is able to locate an edge position by finding the point at which two adjacent previously reconstructed samples have the greatest difference in sample value. Each reconstructed sample will have its own corresponding sample value. Then because each neighboring block can be assumed to have been uniquely predicted and reconstructed, it can be assumed that while reconstructed samples within a same block will share similar sample values, samples belonging to separate blocks will not share similar sample values. Therefore it reasons that at the edge point where the end of one block becomes the start of the next adjacent block, comparing the two adjacent samples where one sample belongs to a first block and the second sample belongs to a second block will result in the greatest difference in sample values. So in FIG. 16, the decoding unit may calculate the differentials for all adjacent samples that make up the row of samples that line up immediately to the top of the current prediction unit 1601. Then, when the decoding unit finds the greatest differential in sample values between two adjacent samples, this can be considered the point at which there is an edge between two adjacent blocks. And correspondingly, this is the point where the decoding unit may consider being the x-coordinate for the first prediction sample C that is received in a reconstructed state. Similarly, the decoding unit will calculate the differentials for all adjacent samples that make up the column of samples that line up immediately to the left of the current prediction unit 1601. Then, where the decoding unit finds the greatest differential in sample values between two adjacent samples, this can be considered the point at which there is an edge between two adjacent blocks. And correspondingly, this is the point where the decoding unit may consider being the y-coordinate for the first prediction sample C that is received in a reconstructed state.

Another method for determining the coordinates of a first prediction sample that is transmitted by in a reconstructed state, is for a decoding unit receiving the prediction unit to parse partition information for neighboring blocks. Typically, a video signal that is encoded by the encoding unit will be comprised of video data and identifying information. The prediction unit may be considered to be part of the video data, and the partition information may be considered to be part of the identifying information. The partition information identifies how each block of video data is partitioned into smaller blocks of video data. For instance a tree block of data may be partitioned into a plurality of coding blocks, then each coding block may be partitioned into a plurality of prediction blocks/units, then each prediction block/unit may be partitioned into a plurality of transform blocks/units, and so on. It is also within the scope of the present invention to partition video data into non-square areas of sample data, in which case geometry block partition information may also be included as part of the identifying information.

In any case, such partition information is transmitted as part of the identifying information along with the prediction units that comprise the video data in the video signal. Thus upon receiving the video signal including the prediction units and partition information, the decoding unit will be able to parse the partition information to determine the partition size of each prediction unit that neighbors a current prediction unit. This is depicted in FIG. 17.

Figure 17:
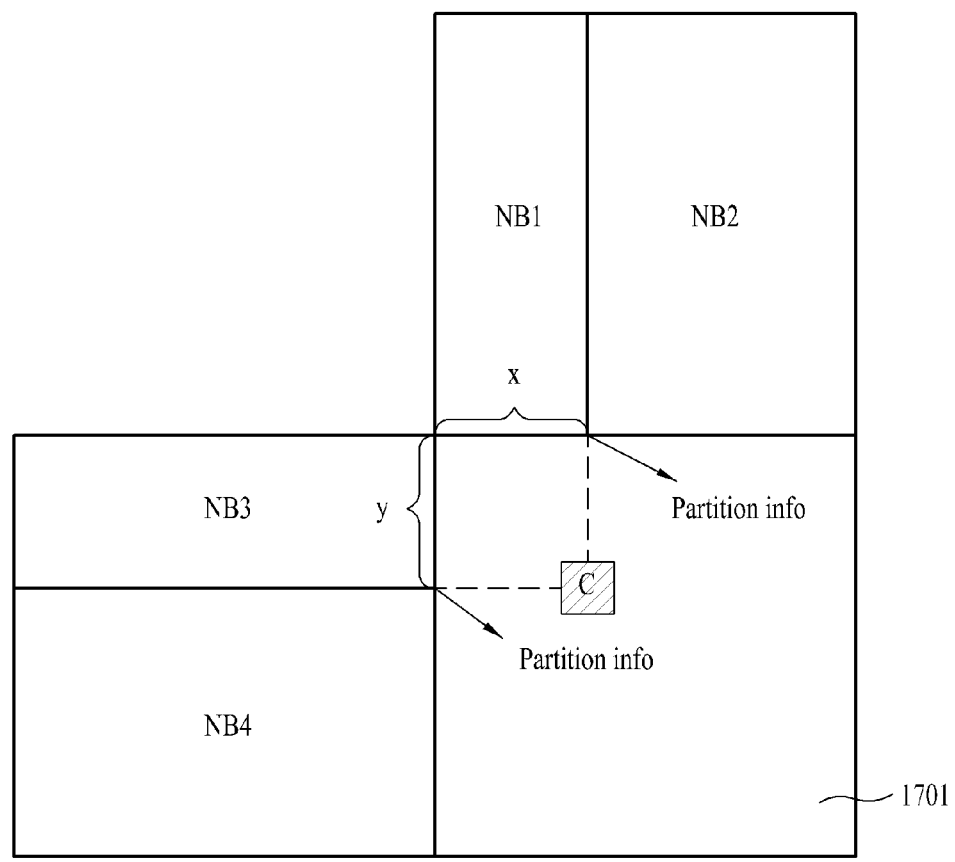
FIG. 17 illustrates an example for determining the location for a first sample of a prediction unit according to the present invention.

In FIG. 17, if a decoding unit receives current prediction unit 1701 and is processing a prediction on current prediction unit 1701 according to the new intra planar mode of the present invention, the decoding unit will have also received and parsed partition information pertaining to the blocks that neighbor current prediction unit 1701. Thus the partition information will identify the size of each partitioned block of video data that neighbors to the top of the current prediction unit 1701. And from this partition information, the decoding unit is able to identify where the partition between neighboring top block NB1 and NB2 occurs. And from this determination, the decoding unit can follow the resulting edge line to determine the x-coordinate for the first current prediction sample C. Similarly, the partition information will identify the size of each partitioned block of video data that neighbors to the left of the current prediction unit 1701. And from this partition information, the decoding unit is able to identify where the partition between neighboring left blocks NB3 and NB4 occurs. Then by knowing where the partition between neighboring left block NB3 and NB4 occurs, the decoding unit can follow the resulting edge line to determine the y-coordinate for the first current prediction sample C.

So when the location of the first prediction unit that is transmitted in a reconstructed state is selected to coincide with edge lines resulting from the partitioning of neighboring blocks, a decoding unit may successfully identify these edge lines to determine the location for the first prediction unit that is transmitted in the reconstructed state.

Figure 18:
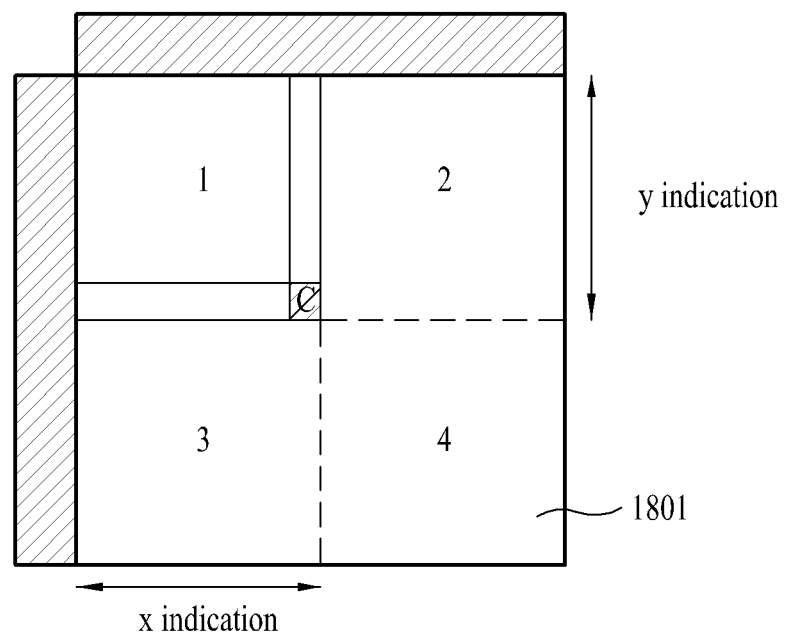
FIG. 18 illustrates a method for processing a prediction unit after having received a first sample of the prediction unit according to the present invention.

Now after receiving the prediction unit containing the first prediction sample that is in a reconstructed state, and then determining the location of the first prediction sample, prediction for the remaining samples within the prediction unit according to the new intra planar prediction modes of the present invention may be processed. So in FIG. 18, the first current prediction sample C is seen to have been received in a reconstructed state, and the location of the first current prediction sample C has been determined to have the corresponding x-coordinate and y-coordinate. Now the block marked as 1 that is within the current prediction unit 1801, and is defined by having the first current prediction sample C as its bottom-right sample, is predicted by any one of the embodiments for the new intra planar mode of the present invention. After predicting the samples of block 1, then the remaining current prediction samples that are within the current prediction unit 1801 are marked as blocks 2, 3 and 4. These remaining samples may be predicted by any one of the embodiments of the new intra planar mode of the present invention. This may be accomplished by first reconstructing the bottom-right sample within each block 2, 3 and 4 and referencing this bottom-right sample for predicting each individual block 2, 3 and 4 separately. Or the remaining samples within blocks 2, 3 and 4 may be predicted as a whole. In any case the remaining samples in block 2, 3 and 4 may be predicted according to any one of the embodiments of the new intra planar mode according to the present invention.

Or as an alternative, the remaining samples within blocks 2, 3 and 4 may be predicted by copying the reconstructed samples within any of the neighboring blocks that have been previously reconstructed, for instance block 1.

Figure 19:
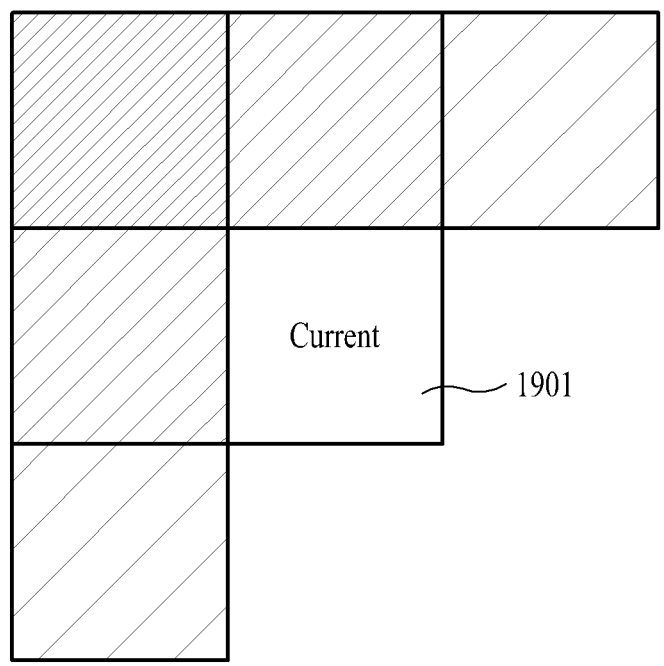
FIG. 19 illustrates the relationship between a prediction unit and blocks of video data that neighbor the prediction unit according to the present invention.

Or as another alternative, the remaining blocks may be predicted by referencing samples from a neighboring block that is determined to be a dominant block. The dominant block will have sample characteristics that are most similar to the current block that is being prediction processed. This is illustrated in FIG. 19, where the current prediction block 1901 is currently being predicted. For exemplary purposes, each neighboring block is depicted as having various shades of gray, wherein the darker shading indicates a higher dominance. The neighboring top-left block is seen to have the highest dominance, and therefore the neighboring top-left block will be referenced to predict the current prediction block 1901. By referencing the neighboring top-left block, the current prediction block may be predicted by simply copying the samples from the neighboring top-left block or by referencing the samples within the neighboring top-left block to perform prediction processing according to any of the available intra prediction modes.

In order to identify the most dominant neighboring block for the current prediction block 1901, dominant block information will be included as part of the identifying information that is transmitted as part of a video signal by an encoding unit. Then when a decoding unit receives the video signal including the dominant block information and the current prediction block 1901, the decoding unit will be able to parse the dominant block information to determine which neighboring block will be referenced for predicting the current prediction block 1901.

Figure 20:
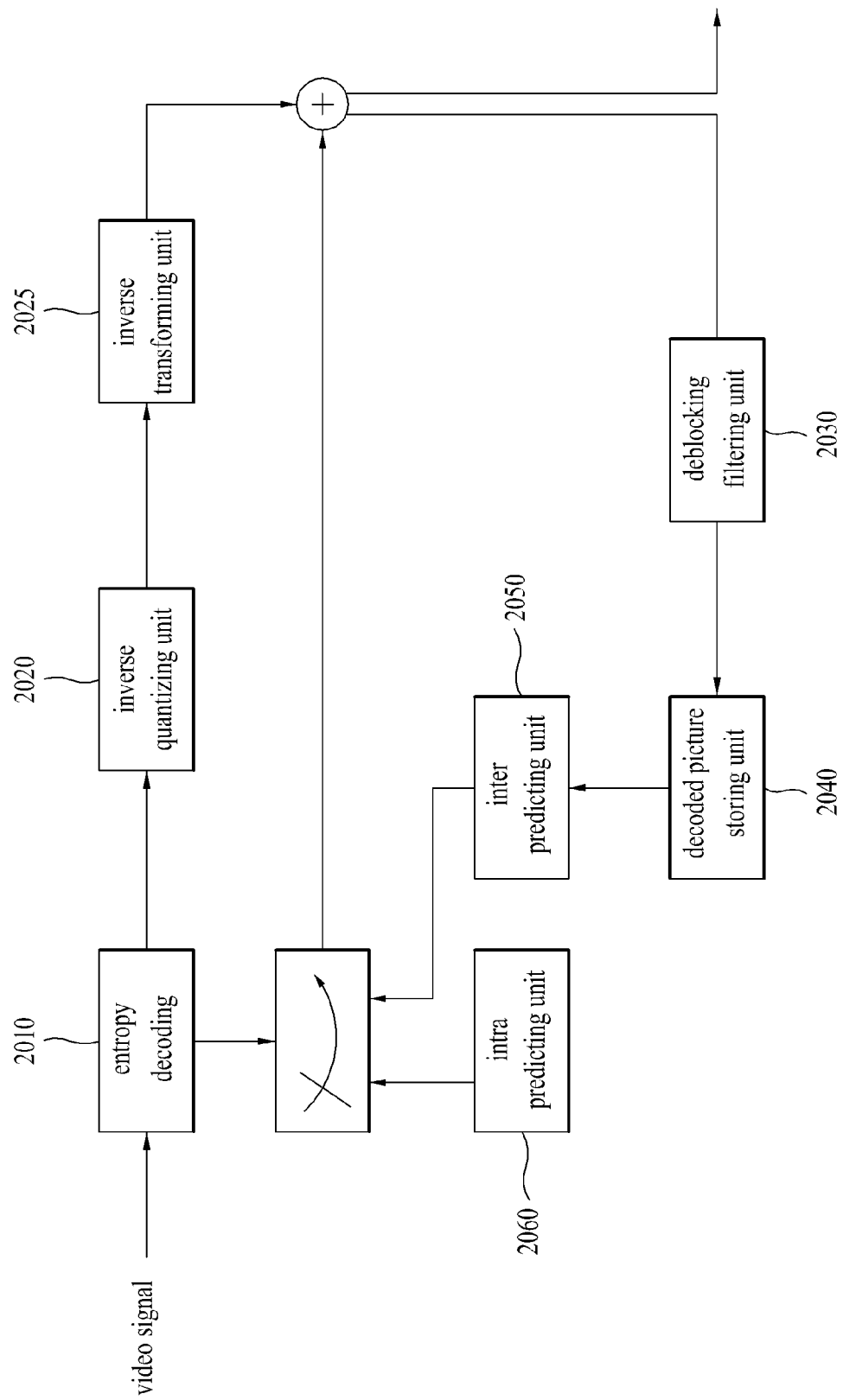
FIG. 20 illustrates a decoding unit according to the present invention.

FIG. 20 is a schematic block diagram of a video signal decoding unit that may be used to perform the new intra planar mode predictions according to the present invention.

Referring to FIG. 20, the decoding unit according to the present invention includes an entropy decoding unit 2010, an inverse quantizing unit 2020, an inverse transforming unit 2025, a deblocking filtering unit 2030, a decoded/reconstructed picture storing unit 2040, an inter prediction unit 2050 and an intra prediction unit 2060.

The entropy decoding unit 2010 extracts a transform coefficient of each block of video data, a motion vector, a reference picture index and the like by performing entropy decoding on a video signal bitstream that is encoded by an encoding unit (not pictured). The inverse quantizing unit 2020 inverse-quantizes the entropy decoded transform coefficient, and the inverse transforming unit 2025 then restores an original sample value using the inverse-quantized transform coefficient. The deblocking filtering unit 2030 is applied to each coded block of video data to reduce block distortion. A picture through filtering is stored in the decoded picture storing unit 2040 to be outputted or used as a reference picture. The inter predicting unit 2050 predicts a current picture using the reference picture stored in the decoded picture storing unit 2040 and inter prediction information (e.g., reference picture index, motion vector, etc.) delivered from the entropy decoding unit 2010. In particular, motion vectors of blocks adjacent to a current block (ie. neighboring blocks) are extracted from a video signal. A predicted motion vector of the current block may be obtained from the neighboring block. The neighboring block may include a block located at a left, top or right top side of the current block. For instance, a predicted motion vector of a current block may be obtained using median value of horizontal and vertical components of motion vectors of neighboring blocks. Alternatively, in case that a left block of a current block has at least one prediction block coded in an inter mode, a predicted motion vector of the current block may be obtained using a motion vector of a prediction block located at a top side of the current block. In case that a top block of a current block has at least one prediction block coded in an inter mode, a predicted motion vector of the current block may be obtained using a motion vector of a prediction block located at a most left side. In case that blocks located at top and right sides of a current block among neighboring blocks are located outside a boundary of a picture or slice, a predicted motion vector of the current block may be set to a motion vector of a left block. If there exists one block having the same reference picture index of a current block among neighboring blocks, a motion vector of the block may be used for motion prediction.

The intra predicting unit 2060 performs intra prediction by referencing previously reconstructed samples from within a current picture. The reconstructed sample within the current picture may include a sample to which deblocking filtering is not applied. An original picture is then reconstructed by adding the predicted current picture and a residual outputted from the inverse transforming unit 2025 together. For each prediction unit of video data, each current prediction sample of a current prediction unit will be processed according to the new intra planar mode prediction of the present invention by the intra prediction unit 2060. Then the predicted current prediction samples will be reconstructed by combining the predicted samples with a residual outputted from the inverse transforming unit 2025.

Figure 21:
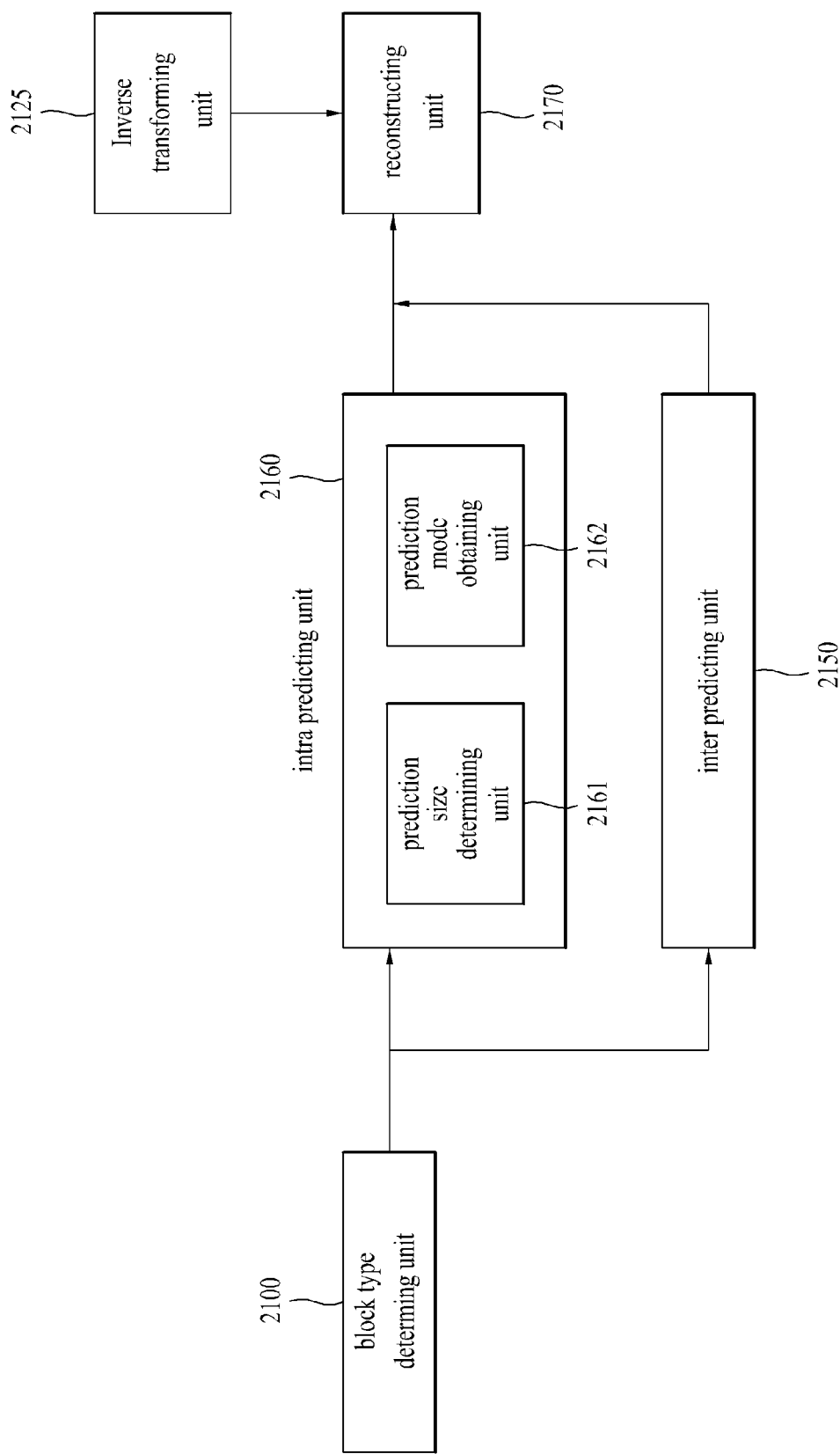
FIG. 21 illustrates a close up view of the prediction units that are part of the decoding unit illustrated in FIG. 20.

FIG. 21 is a block diagram of an alternative view of the decoding unit illustrated by FIG. 20. FIG. additionally includes a block type determining unit 2100 and a reconstructing unit 2170. The block type determining unit 2100 determines whether a current prediction unit is an inter predicted type unit or an intra prediction type unit. If the block type determining unit determines that the current prediction unit is an inter prediction type unit then the current prediction unit will be sent along to the inter prediction unit 2150. And if the block type determining unit determines that the current prediction unit is an intra prediction type unit, then the current prediction unit will be sent along to the intra prediction unit 2160.

FIG. 21 also illustrates that the intra prediction unit 2160 is comprised of a prediction size determining unit 2161 and a prediction mode obtaining unit 2162. The prediction size determining unit 2161 is able to determine the size of a current prediction unit that is being predicted by the intra prediction unit 2160 by either parsing identifying information that is encoded into the video signal by an encoding unit and is received by the decoding unit, or by directly processing the current prediction unit to determine its size. So according to the first method, the encoding unit that encodes the video signal and accompanying identifying information, will include size information for each prediction unit of video data that is encoded into the video signal. Then the decoding unit need only parse the identifying information from the video signal to determine the size for each prediction unit it receives. According to the second method, the encoding unit does not expressly include size information for each prediction unit of video data into the video signal. Instead, the prediction size determining unit 2161 of the decoding unit is tasked with processing each prediction unit to determine the size of each prediction unit. It should be noted that according to the first method, the actual parsing of the identifying information to determine the size of each prediction unit may be processed by either the prediction size determining unit 2161 or the entropy decoding unit 2010 as seen in FIG. 20.

The prediction mode obtaining unit 2162 is tasked with parsing identifying information that is included in a video signal to determine the proper intra prediction mode to apply to each current prediction unit that is being predicted by the intra prediction unit 2160. So according to the present invention, the prediction mode obtaining unit 2162 will process signaling information from the identifying information included in a video signal and determine from the signaling information that the new intra planar mode for prediction should be applied to a current prediction unit.

And once the current prediction unit is properly predicted by the intra prediction unit 2160 according to the proper intra prediction mode identified by the prediction mode determining unit 2162, the predicted samples of the current prediction unit will be reconstructed by the reconstructing unit 2170. The reconstructing unit 2170 is able to reconstruct the predicted samples by combining them with residual values obtained from the inverse transforming unit 2125.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of processing a video signal by a decoding apparatus, the method comprising:
   obtaining, by the decoding apparatus, intra prediction mode information of a current block from the video signal;
   based on the intra prediction mode information indicating that the current block is coded in intra planar prediction mode, predicting, by the decoding apparatus, a video data sample included in the current block by a bi-linear interpolation using a first reference sample, a second reference sample, a third reference sample and a fourth reference sample,
   wherein the first reference sample is a left neighboring sample adjacent to the current block having a same y-coordinate as the video data sample, the second reference sample is a top neighboring sample adjacent to the current block having a same x-coordinate as the video data sample, the third reference sample is located in an upper-right block, and the fourth reference sample is located in a lower-left block; and
   reconstructing, by the decoding apparatus, the current block based on the predicted video data sample.

2. The method of claim 1, wherein the third reference sample corresponds to a sample located at a lower-left corner of the upper-right block.

3. The method of claim 1, wherein the fourth reference sample corresponds to a sample located at a top-right corner of the lower-left block.

4. The method of claim 1, wherein a weighting factor based on a difference between an x-coordinate of the video data sample and an x-coordinate of the left neighboring sample is applied to the third reference sample, and
   wherein a weighting factor based on a difference between the x-coordinate of the video data sample and an x-coordinate of a rightmost sample having the same y-coordinate as the video data sample within the current block is applied to the first reference sample.

5. The method of claim 1, wherein a weighting factor based on a difference between a y-coordinate of the video data sample and a y-coordinate of the top neighboring sample is applied to the fourth reference sample, and
   wherein a weighting factor based on a difference between the y-coordinate of the video data sample and a y-coordinate of a bottommost sample having the same x-coordinate as the video data sample within the current block is applied to the second reference sample.

6. The method of claim 1, wherein the bi-linear interpolation includes:
   performing a first linear interpolation of the first reference sample and the third reference sample and a second linear interpolation of the second reference sample and the fourth reference sample, and
   obtaining the predicted video data sample from a result of the first linear interpolation and a result of the second linear interpolation.

7. The method of claim 6, wherein the predicted video data sample is obtained by averaging the result of the first linear interpolation and the result of the second linear interpolation.

* * * * *